United States Patent
Brave et al.

(10) Patent No.: US 11,216,508 B2
(45) Date of Patent: *Jan. 4, 2022

(54) ENTITY RESOLUTION

(71) Applicant: FullContact, Inc., Denver, CO (US)

(72) Inventors: Scott Brave, Louisville, CO (US); Daniel Kenton Lynn, Littleton, CO (US)

(73) Assignee: FULLCONTACT, INC., Denver, CO (US)

(*) Notice: Subject to any disclaimer, the term of this patent is extended or adjusted under 35 U.S.C. 154(b) by 83 days.

This patent is subject to a terminal disclaimer.

(21) Appl. No.: 16/601,971

(22) Filed: Oct. 15, 2019

(65) Prior Publication Data
US 2020/0042558 A1 Feb. 6, 2020

Related U.S. Application Data

(63) Continuation of application No. 15/627,873, filed on Jun. 20, 2017, now Pat. No. 10,445,371, which is a
(Continued)

(51) Int. Cl.
*G06F 16/901* (2019.01)
*G06F 16/28* (2019.01)
(Continued)

(52) U.S. Cl.
CPC ...... *G06F 16/9024* (2019.01); *G06F 16/2458* (2019.01); *G06F 16/288* (2019.01); *G06Q 10/00* (2013.01); *G06Q 10/107* (2013.01)

(58) Field of Classification Search
CPC ............ G06F 16/9024; G06F 16/2458; G06F 16/288; G06Q 10/00; G06Q 10/107
(Continued)

(56) References Cited

U.S. PATENT DOCUMENTS 6,897,866 B1 5/2005 Hetzler et al.
7,725,421 B1 5/2010 Gedalius et al.
(Continued)

FOREIGN PATENT DOCUMENTS

EP 1693751 A2 8/2006
WO 2012115965 A1 8/2012
(Continued)

OTHER PUBLICATIONS

International Searching Authority, International Search Report for PCT/US2012/043858, dated Sep. 27, 2012.
(Continued)

*Primary Examiner* — Zi Ye
(74) *Attorney, Agent, or Firm* — Holzer Patel Drennan

(57) ABSTRACT

A relationship graph system disclosed herein provides a system and method for inferring relationships between various entities based on analysis of a plurality of observations including elements related to two different entities. The method comprises representing each of the plurality of observations using a relationship edge between two nodes, each of the two nodes representing an element related to one of the two different entities, assigning a score to each relationship edge based on metadata related to the observation represented by the relationship edge, combining a plurality of relationship edges between the elements related to the two different entities to generate an aggregate relationship edge between the two different entities, and inferring a relationship between the two different entities based on length of the aggregate relationship edge between the two different entities.

20 Claims, 14 Drawing Sheets

Related U.S. Application Data continuation-in-part of application No. 13/530,413, filed on Jun. 22, 2012, now Pat. No. 9,684,696.

(60) Provisional application No. 61/500,454, filed on Jun. 23, 2011.

(51) Int. Cl.
*G06F 16/2458* (2019.01)
*G06Q 10/00* (2012.01)
*G06Q 10/10* (2012.01)

(58) Field of Classification Search
USPC .......................................................... 709/224
See application file for complete search history.

(56) References Cited

U.S. PATENT DOCUMENTS

| | | | | |
|---|---|---|---|---|
| 8,131,745 B1 * | 3/2012 | Hoffman | .............. | G06Q 10/107 707/766 |
| 8,578,009 B1 | 11/2013 | Newstadt et al. | | |
| 8,626,835 B1 | 1/2014 | Gyongyi et al. | | |
| 2001/0039544 A1 | 11/2001 | Chakrabarti et al. | | |
| 2002/0065836 A1 | 5/2002 | Sasaki | | |
| 2004/0093331 A1 | 5/2004 | Garner et al. | | |
| 2006/0184584 A1 | 8/2006 | Dunn et al. | | |
| 2006/0294151 A1 * | 12/2006 | Wong | ...................... | G06F 16/25 |
| 2007/0299856 A1 | 12/2007 | McKeon et al. | | |
| 2009/0248709 A1 | 10/2009 | Fuhrmann et al. | | |
| 2012/0117036 A1 | 5/2012 | Lester et al. | | |
| 2013/0339344 A1 * | 12/2013 | Nie | ..................... | G06F 16/9038 707/722 |
| 2015/0142779 A1 * | 5/2015 | Gupta | ..................... | G06F 16/51 707/722 |

FOREIGN PATENT DOCUMENTS

| | | | | |
|---|---|---|---|---|
| WO | WO-2012115965 A1 * | 8/2012 | ............. | G06F 16/00 |
| WO | WO-2017011661 A1 * | 1/2017 | ......... | G06F 16/9535 |

OTHER PUBLICATIONS

International Searching Authority, Written Opinion of the International Searching Authority, PCT/US2012/043858, dated Sep. 27, 2012.

* cited by examiner

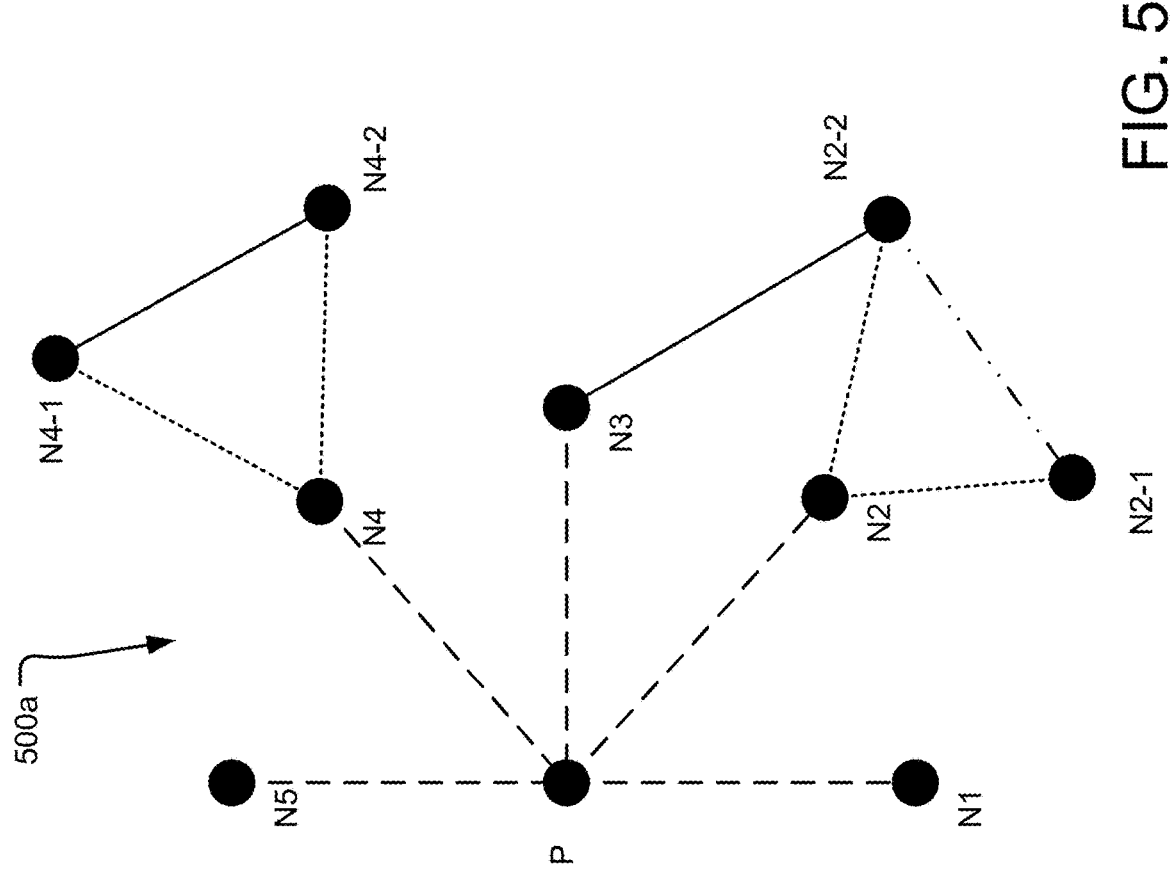
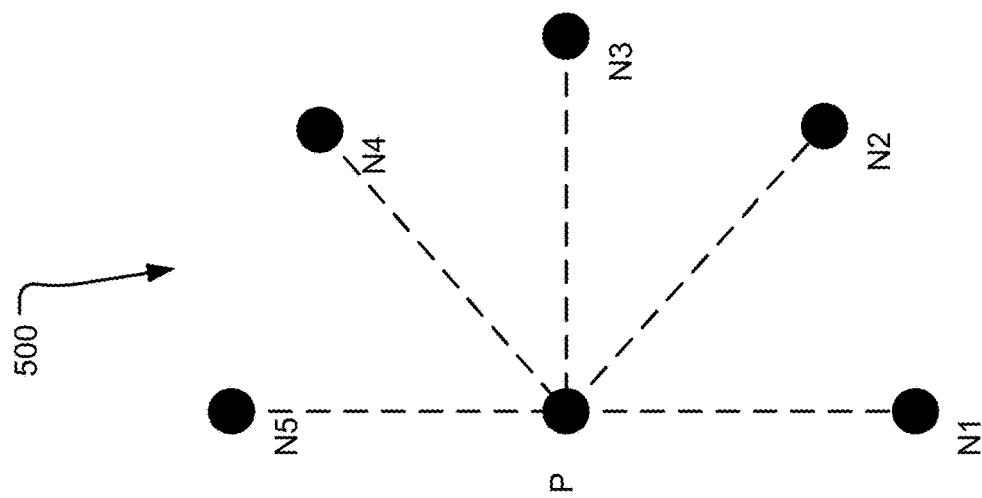
FIG. 5

ENTITY RESOLUTION

CROSS-REFERENCE TO RELATED APPLICATIONS

This application is a continuation of and claims benefit of priority to U.S. Non-Provisional patent application Ser. No. 15/627,873, entitled "RELATIONSHIP GRAPH" and filed on Jun. 20, 2017, which is a continuation-in-part and claims benefit of priority to U.S. Non-Provisional patent application Ser. No. 13/530,413, entitled "INFORMATION CATALOGING" and filed on Jun. 22, 2012 and issued as U.S. Pat. No. 9,684,696 on Jun. 20, 2017, which claims benefit of priority to U.S. Provisional Patent Application No. 61/500,454, entitled "INFORMATION CATALOGING" and filed on Jun. 23, 2011, all of which are incorporated by reference herein in their entirety.

FIELD

Implementations disclosed herein relate, in general, to the information management technology and specifically to technology for cataloging a large amount of information.

BACKGROUND

The use the computers and networking technologies such as the Internet and the World Wide Web have resulted in an explosion of information. Increasingly a large portion of such information is stored on interconnected servers. Enterprises and individuals store and retrieve information from remote locations, such as computers, mobile devices, etc., from remote data and computing servers. For example, a customer relationship management (CRM) system may search information about a customer from a first cloud server storing contact database, a second cloud server storing product database, a third server storing accounting and billing database, etc.

Existing means of doing information search methods that generally involve smaller datasets with long indexing operations. Such existing search methods are incompatible with the large amount of data needed to capture information from the large amount of data available on the Internet, the cloud servers, etc. For example, over several billion e-mail addresses may be available to an Internet search engine doing a search for a particular e-mail address, and building relationships among such e-mail addresses and between the e-mail addresses and other entity information, such as phone numbers, names, addresses, etc., requires prohibitive amount of indexing when current datasets and indexing operations are used.

The information included in this Background section of the specification, including any references cited herein and any description or discussion thereof, is included for technical reference purposes only and is not to be regarded subject matter by which the scope of the invention is to be bound.

SUMMARY

A relationship graph system disclosed herein provides a system and method for inferring relationships between various entities based on analysis of a plurality of observations including elements related to two different entities. The method comprises representing each of the plurality of observations using a relationship edge between two nodes, each of the two nodes representing an element related to one of the two different entities, assigning a score to each relationship edge based on metadata related to the observation represented by the relationship edge, combining a plurality of relationship edges between the elements related to the two different entities to generate an aggregate relationship edge between the two different entities, and inferring a relationship between the two different entities based on length of the aggregate relationship edge between the two different entities.

An alternative implementation of the method disclosed herein further comprises computing a first distance between one of the two disparate nodes to a third node, computing a second distance between the other of the two disparate nodes to the third node, and computing the distance between the two disparate nodes using a combination of the first distance and the second distance. Yet alternative implementation of the method disclosed herein further comprises computing the distance between the two disparate nodes further comprises computing the distance between the two disparate nodes as a ratio of the product of the first distance and the second distance to the sum of the first distance and the second distance.

In an alternative implementation, the method disclosed herein further comprises comparing at least two of the various nodes with each other and removing at least one of the two nodes if the similarity between the two nodes is above a similarity threshold. Yet alternatively, inferring the relationship further comprises inferring higher order relationship between the two disparate nodes. In an alternative implementation, the method disclosed herein further comprises comparing the computed distance to a threshold and inferring the relationship if the computed distance is higher than the threshold. In an alternative implementation, the method disclosed herein further comprises assigning a confidence level to one or more of the nodes, wherein the confidence level is determined based on a source of the observation containing the one or more of the nodes. Alternatively, computing the distance between the two disparate nodes further comprises computing the distance between the two disparate nodes using the confidence level assigned to each of the two disparate nodes. In an alternative implementation, the confidence level assigned to a particular node varies with age of the particular node. Yet alternatively, the confidence level assigned to a particular node varies based on the frequency of observation generating the particular node.

In an alternative implementation, the method disclosed herein further comprises assigning a noise level to one or more of the nodes and calculating a signal to noise ratio (SNR) of an edge based on noise levels of the nodes attached to that node. In an alternative implementation, the method disclosed herein further comprises comparing the SNR of an edge to a threshold and determining validity of a relationship if the SNR is above the threshold. For example, the threshold may be 0.7 or seventy percent. Alternatively, assigning a noise level to a node further comprises determining presence of multiple dissimilar nodes connected to the node. In an alternative implementation, the method disclosed herein further comprises propagating the noise attached to first node to a second node connected indirectly to the first node. Alternatively, in calculating the SNR of an edge, the signal levels of the nodes are added inversely and the noise levels of the nodes are added linearly. Yet alternatively, the elements of the observations (1) are related to one of the entity and (2) represent metadata about the entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 5 illustrates an example block diagram representing operations for noise suppression related to a node in the directed graph.

DETAILED DESCRIPTION

Figure 1:
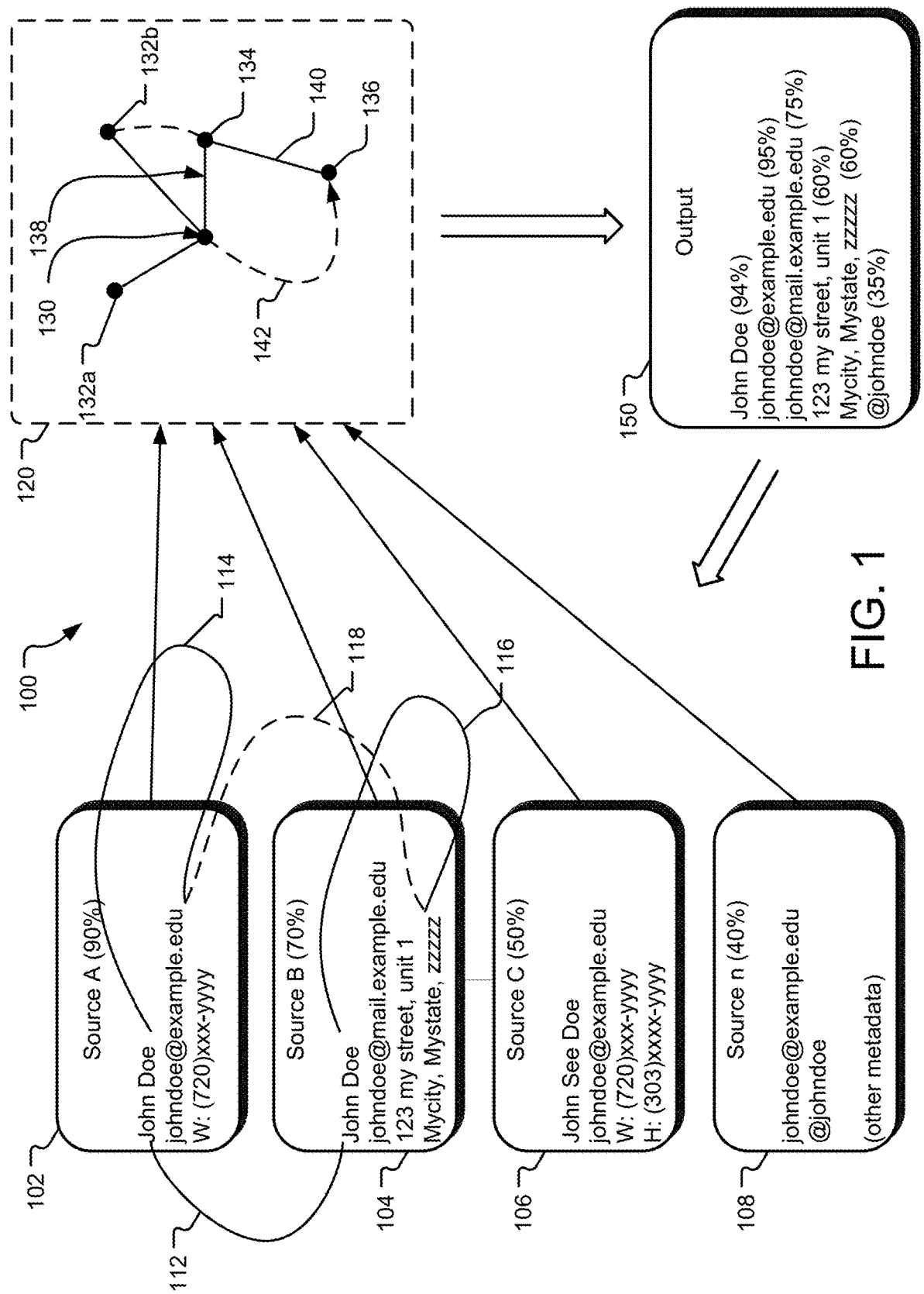
FIG. 1 illustrates an example block diagram representing functioning of an information cataloging system disclosed herein.

An information cataloging system disclosed herein allows cataloging of a large amount of information. For example, a database of user information may include a large number of e-mail addresses. Such database of e-mail addresses may be obtained using a number of different methods, including, obtaining the database from database vendors, obtaining the database from a social network operator, obtaining the database using Internet search engines, etc. Such data points are typically highly fragmented and would require a very large and generally prohibitive amount of indexing to establish any meaningful relationships among such data points. For example, to establish relationships between two data points that are not directly related to each other requires nested or recursive indexing, resulting in a requirement for a large amount of computing or processing resources. Generally, any attempt to associate the e-mails from the database to various entities, such as individuals, businesses, etc., requires a very large amount of indexing. Using traditional indexing methods to determine other information associated with such e-mail addresses, such as phone numbers, addresses, etc., requires a large number of data points. Furthermore, the higher the statistical confidence required of such associations, the higher is the number of data points that would need to be indexed.

The information cataloging system disclosed herein provides an efficient method of creating associations between a large number of observations. Specifically, the information cataloging system provides building such associations with a high level of confidence. For example, there are a large number of e-mail addresses in use and large information processing entities have access to a large number of such addresses, sometimes more than a billion. Moreover, each of these e-mail addresses has a number of other information attached to them. For example, an entity providing customer relationship management (CRM) system may have various databases having the e-mail addresses attached to client information. A social networking entity may be a have a large number of e-mail addresses in its database with each e-mail attached to a user, the user identifying information, the user's location, work, etc.

Furthermore, individual users have several e-mail addresses at any given time and such e-mail addresses vary over time. For example, when a particular user changes jobs, that user's work e-mail would most likely change. Furthermore, users also change their personal e-mail addresses over their life. Given the large number of e-mail addresses, the varying nature of the e-mail addresses, the varying nature of the e-mail addresses relation to other user identifying data, it becomes very difficult to identify relationships of the e-mail to other user identifying information. Similarly, phone numbers, Twitter™ addresses, etc., are other user identifiers with a very large data set, and each one of these user identifiers pose similar challenges in generating associations thereto. For example, it will take a prohibitive amount of time and computing resources to generate relationships between the given user identifying pieces of information, such as e-mails, names, etc., and identify other related information about such users.

The information cataloging system disclosed herein allows a user to take a user identifying piece of information, such as an e-mail address, phone number, etc., and generate other information attached to the user, such as the user's address, work, age, gender, etc., with a high degree of statistical confidence.

An implementation of the information cataloging system disclosed herein takes datasets form disparate entities, such as CRM dataset, billing dataset, e-mail dataset, etc., and generates identities using such datasets. For example, such an implementation takes contact information from various datasets and automatically creates an identity based on the individual records in each of the various datasets. For example, such disparate datasets may include a dataset about users from an e-mail database, such as Microsoft Outlook™, a billing dataset such as a dataset from Quicken™ Accounting, and a social networking dataset, such as a dataset from Google+™, and creates single identity for a user based on the records from each of such datasets. An example implementation of the information cataloging system disclosed herein collects a large amount of observation points, each observation point containing information about an individual or an entity, creates relationships among these observation points, and uses the observation points and the relationships to determine relationships among disparate observations with high degree of confidence.

FIG. 1 illustrates an example block diagram 100 representing functioning of an information cataloging system disclosed herein. The information cataloging system receives various observations 102-108 about an individual John Doe from a variety of sources. For example, an observation 102 received by the information cataloging system includes, a name, an e-mail address, and a phone number for John Doe from a CRM system. Because the observation 102 is received from a CRM system, the information cataloging system assigns a high level of confidence, 90% to observation 102. In one implementation, the confidence level assigned to the observation is also assigned to each of the elements of that particular observation. Thus, the e-mail address johndoe@example.edu, and the work phone number (720)xxx-yyy will be assigned a confidence level of 90%.

Another observation point 104 may be John Doe's address from a telephone book that attaches John Doe's name with his e-mail address and his mailing address. On the other hand, the observation 106 may be received from an online account, such as a LinkedIn™ account, whereas the observation 108 may be received from an Internet search result that also provides the Twitter™ account for John Doe. In an alternative implementation, observations can also be obtained from queries provided by users to the information cataloging system. For example, if a user provides a query to find further information about a person with an e-mail address of johndoe@example.com in the city of Johnstown, the information cataloging system may create a new observation with relation between elements johndoe@example.com and Johnstown. In an alternative implementation, an observation may also include other metadata about an entity. For example, the observation 108 includes information about John Doe's visiting the Starbucks™ at a given frequency. Such metadata may also be used together with the other elements of the observation 108 in developing relationships between elements of the observation 108 and other elements from observations 102-106.

The information cataloging system saves each of these observation points 102-108 in one or more databases. Furthermore, each of the elements from the various observations are represented by nodes. Thus, the name John Doe is represented by a node, the e-mail address johndoe@example.com is represented by another node, etc. In one implementation, the information cataloging system compares an element received from an observation with existing elements stored in the system and if an exact match is found for the newly received element, the nodes representing such similar elements are collapsed into one node.

In an alternate implementation, a high level of similarity, even if it is not one hundred percent, can still be enough for the system to collapse nodes representing two highly similar nodes into one. For example, in the example implementation, the nodes created for the name John Doe from the observations 102 and 104 may be collapsed into one node. Similarly, the node for the name John See Doe, received from the observation 106 may also be collapsed with the node for the name John Doe from observations 102 and 104 due to the high level of similarity and/or the commonality of other related nodes (for example, each of the nodes representing John Doe and John See Doe, from observations 102 and 106, are connected to e-mail johndoe@example.edu. Similarly, even though the e-mail address for the observation 104, johndoe@mail.example.edu is different than the e-mail address for the observations 102 and 16, given the similarities of the base domain (example.edu), the high level of similarity between the e-mail addresses and the names show a very high likelihood of these observations being for the same entity.

Subsequently, the information cataloging system represents the relationships between various elements by edges in a directed graph. Thus, a relationship between the node representing the name John Doe is connected by an edge 114 to the e-mail johndoe@example.edu, another edge 116 represents an edge between the node for name John Doe and the node for John Doe's mailing address. Furthermore, the system also assigns distances to the edges. Such distances may be assigned based on the confidence level of the source, the frequency with which an observation is received, etc.

After representing the elements and the observed relationships using the nodes and the edges, the information cataloging system traversers the edges to create various computed edges (also referred to herein as the "higher order" edges). For example, FIG. 1 illustrates a computed edge 118 between the e-mail address of johndoe@example.edu and John doe's mailing address. In one implementation, the information cataloging system also assigns confidence to the edges based on the confidence assigned to the end nodes of the edges. Subsequently, the system generates inferences about the relations among the various elements of these observations.

The value assigned to edges between the nodes also changes over time. For example, an edge representing a relation between a name node and an e-mail node, where the relation is based on an observation that was obtained from a business card five years ago is less likely to show a valid relation between the name and e-mail address from that particular observation. Similarly, the value assigned to relations between data points of an observation increases if it is seen more often. Thus, for example, if a relation between Jane Doe's name and her e-mail address Janedoe@email.com is observed from more than one observation, the value assigned to this edge is increased with each new observation.

In one implementation, the system speculatively traverses the edges based on various measures such as a distance attributed to the edges, etc. FIG. 1 illustrates a directed graph 120 including some of the nodes and edges generated based on the elements of observations 102-108. A directed graph may be defined as a graph or set of nodes connected by edges where the edges have a direction associated with them. Such edges may be one-directional or bi-directional. In an alternative implementation, any two nodes of a directed graph may be connected to each other by two edges, each having a distinct direction. For example, a first node may be connected to a second node by a first edge directed from first node to the second node. Furthermore, the first node and the second node may also be independently connected by a second edge, which may have a direction different than the direction of the first edge. In the implementations disclosed herein, when a direction of the edges is not specified, such an edge may be considered to be bi-directional. In the directed graph 120, a node 130 represents the name John Doe, received from observation 102, the name John Doe from observation 104 is represented by a node 132a, and the name John See Doe from observation 106 is represented by a node 132b. Node 134 represents the e-mail address johndoe@example.edu and a node 136 represents a social networking account address @johndoe, each coming from the observation 108.

Given that the nodes 130 and 132a represent name values with very high level of similarity (in this case, one hundred percent), the system may collapse them both into the same node 130. In an alternative implementation, if the similarity between two nodes are above a given similarity threshold value, the system may collapse such two nodes into a single node. Furthermore, given the high level of similarity between the values for nodes 130 and 132b and given that each of 130 and 132b are connected to a common e-mail address represented by node 134, the system may also collapse the node 132b into node 130.

The edge 138 represents the relation between the name node 130 and the e-mail node 134 as per the observations 102 and 106. Given that the edge 138 was obtained based on two nodes the edge 138 may be assigned a higher confidence value. In one implementation, the higher the confidence value assigned to an edge, the lower is the distance assigned to that edge. Thus, it is assumed that if two nodes are closer, they are more likely to belong to the same entity. Thus, the distance between two points may be considered to be the inverse of the likelihood or probability of these two points belonging to the same entity. Thus, mathematically:

Distance between two points~1/probability of the two points being the same

Now referring back to FIG. 1, the edge 140 represents the relation between the e-mail node 134 and the social networking account node 136, as obtained from the observation 108. In this case, because the observation 108 has a low confidence value attached thereto, the edge 140 will also have a lower confidence value (higher distance) assigned to it. The system uses the path 130-134-136 to generate a new computed edge (higher order edge) 142. The computation of the confidence (the distance) of the computed edge 142 is further discussed in detail below in FIG. 3.

The system uses the values assigned to various nodes and edges of the directed graph 120 to generate an output 150. In one implementation, the output 150 provides a listing of various elements related to John Doe. As illustrated herein, the output provides various elements from each of the observations 102-108 in a combined manner. Furthermore, the output 150 also provides confidence levels for each of the elements so that a user of the output 150 may determine whether to use a certain element or not. In One Alternative implementation, the information cataloging system disclosed herein may also automatically update one or more of the sources of the observations 102-108. For example, the output 150 may be used to update a CRM database that provided the observation 102, etc.

Figure 1A:
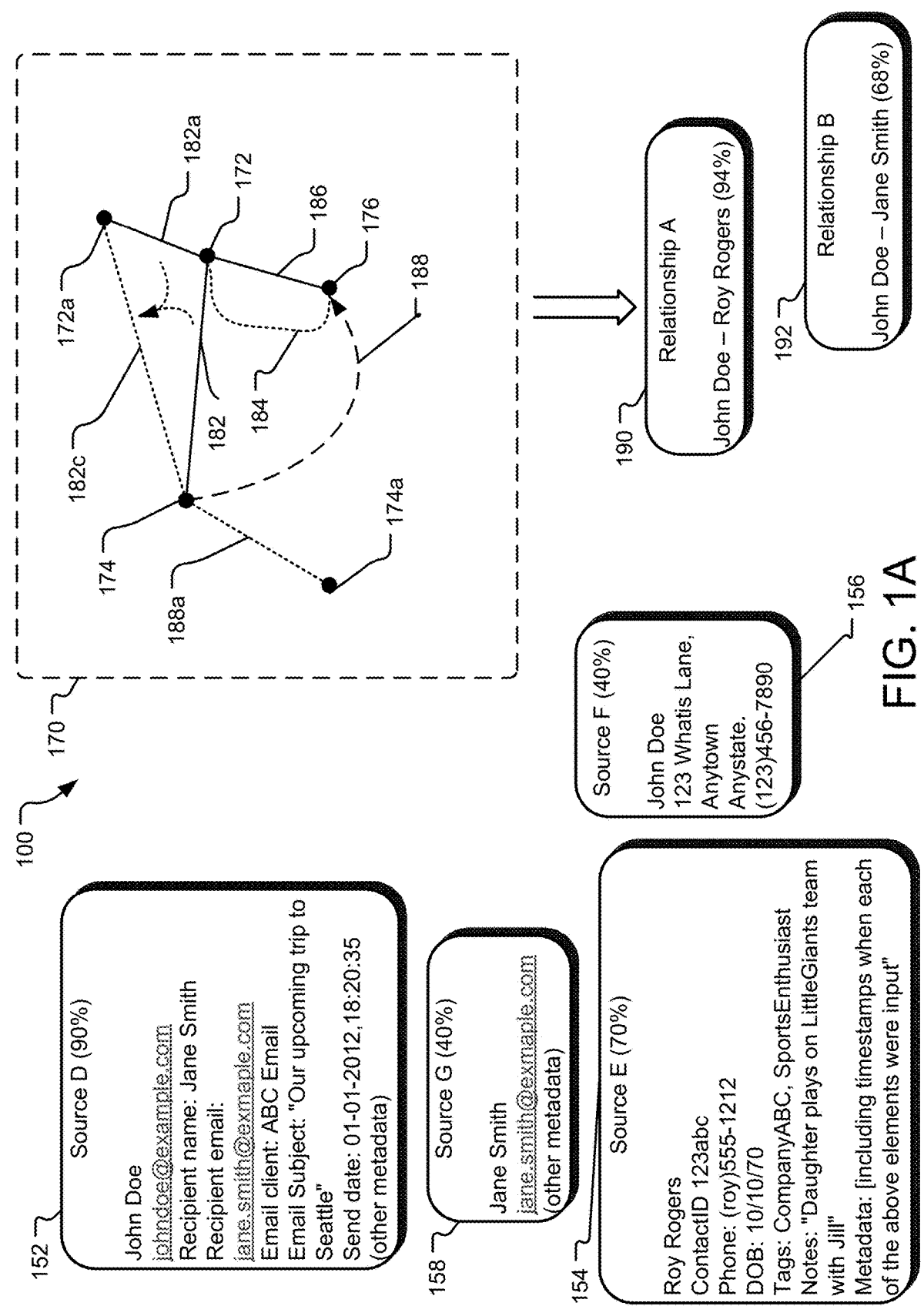
FIG. 1A illustrates an alternative example block diagram representing functioning of a relationship graph system disclosed herein.

While the one or more observations 102-108 disclosed in FIG. 1 include elements about a single entity (John Doe), other observations may include elements related to more than one entity. FIG. 1A illustrates such alternative observations. Specifically, an observation D 152 is an observation representing a communication between an entity John Doe and another entity Jane Smith. Specifically, observation D 152 may include an email address representing someone John Doe has sent an email to, along with the specific email address from which he sent it. The observation D 152 may have a trustworthiness score attached with it (e.g., 90%) indicating whether the observation represents a valid observation. Thus, if an email observation was deemed to be an email generated by mass email marketing, such an email may have a low trustworthiness score attached to it compared to an individual email between two entities. Furthermore, metadata on such an observation may include additional information about the communication such as the subject and text of the email message, the time and date at which the email was sent, whether the message was in reply to a previous email and, if so, the time interval between the two correspondences, etc.

In a similar manner, other observations may also represent various forms of communication and other interactions or connections between multiple entities. The elements within the observation may represent the handles or touch points used in the communication, such as a phone number, email address, social handle, username, etc. Alternatively, an element in an observation may simply refer to an entity such as a social security number or other identifier assigned internal or external to the information cataloging system, such as an application-specific individual, contact, or transaction id. Other examples of interactions may include making a phone call, sending a text message, connecting to or following someone on a social network or other application, sending physical mail, or any other interaction or connection in the physical or online spheres. Thus, regarding observation D 152, the element "recipient email," represents information about another entity, Jane Smith, having a relation with the entity John Doe. Here an observation G 158 represents another observation about the entity Jane Smith that may be related to the observation D 152.

It is not necessary that both parties be aware or are directly involved in an interaction for an observation to occur. For example, an individual may add someone to their address book or simply interact with their online representation in some way. Other types of relationships may also be represented in observations including family relationships, organizational relationships such as at schools or within companies, shared interests, etc. For example, John Smith may have a contact for Roy Rogers in his address book with information including his personal cellphone number, his birthday, a tag indicated that they worked together at a previous job, and a note suggesting that they have children who play on a softball team together. Such an observation is represented by the observation E 154. Additionally, the entity Roy Rogers may also have contact for the entity John Doe in his address book which includes John Doe's cellphone number and a home address. Such an observation is illustrated by the observation F 156.

In an implementation of the relationship graph system disclosed herein, the relationship graph system may infer a relationship or set of relationships between John Doe and Roy Rogers, including for example, a previous work relationship, a personal connection through kids, and a level of trust given that each has one another's personal cellphone number and one knows the other's home address.

In one implementation, the elements involved in an interaction or other connection are represented as nodes in the relationship graph system, and the interaction or relationship between those elements are represented by edges connecting the nodes as represented by a relationship graph 170. For example, in the relationship graph 170, element johndoe@example.com is represented by node 172, element jane.smith@example.com is represented by node 174, and element (roy)555-1212 (Roy Roger's phone number) is represented by node 176. In such representation, an edge 182 represents the relationship between the elements johndoe@example.com and jane.smith@example.com, 184, 186 represent relationships between elements johndoe@example.com and (roy)555-1212, and 188 represents relationship between jane.smith@example.com and (roy)555-1212.

The edges 182-188 may include a score representing the strength of an interaction or relationship and that score may change over time based on factors such as the recency of the interaction or relationship. More generally, an edge may include a vector of scores or other values to represent relevant metadata about the interaction. For example, the observation from source D 152 may lead to generation of the edge 182 between elements johndoe@example.com and jane.smith@example.com. Such relationship edges 182-188 may exist alongside other edges that represent identification edges such as an edge between the johndoe@example.com node and the John Doe node (as illustrated in FIG. 1). For example, the element johndoe@example.com may be related to a node 172a for John Doe by an edge 182a, where the node 172a represents a personal email address Johndoe@personal.com.

In such cases the two types of edges may be assigned different types or classifications to distinguish them. Thus, edges between elements based on relationships are referred to be the relationship edges (182-188), whereas edges between elements without relationships (such two different emails from two different observations) are referred to be observation edges.

Scores for relationship edges may be absolute based on the observations that directly led to those edges or scores may be relative to other relationship edges and observation edges connected to the relevant nodes. For example, the score given to a relationship edge representing an email communication from John Doe to Jane Smith may be take into account how often John emails or otherwise communicates with his friends and colleagues on average.

After representing relationship observations and other observations as nodes and edges, the relationship graph system may speculatively traverse the edges to determine a score between disparate nodes and entities, and may also generate a new edge with that score. Such a process may be used to score distances between entities, for example to determine social distance and suggest introductions or judge certain pathways crossing multiple entities and assess the likelihood of successful interaction. For example, the relationship graph system may determine that the best way for John Doe to get in touch with Jane Smith is through their mutual friend Roy Rogers. Optimal pathways may be also assessed by considering the edges between specific elements of entities. For example, the system may determine that the best communication pathway between John Doe and Jane Smith is for John Doe to first email Roy Rogers and then for Roy to call Jane on her mobile phone.

For example, the relationship graph system may determine that the node 172a representing email address johndoe@personal.com may be the best node to represent John Doe given that John has had this email address for many years and given the relationship graph system knowledge that personal email addresses change infrequently for individuals with his demographics or other personal attributes. Similarly, Jane Smith's cellphone number 174a may be selected as her representative node for similar reasons.

Furthermore, the relationship graph system may also collapse multiple relationship edges between two nodes related to an entity into a single edge between such two nodes using one node per entity as a representative node for that entity. In such a case, the relationship graph system selects a best node to represent an entity. Alternatively, a new node may be generated to represent an entity in a manner similar to the process of collapsing multiple similar nodes into a single node. For example, if the node 172a representing email address johndoe@personal.com is selected to represent John Doe, the relationship edge 182 and the observation edge 182a may be collapsed into an edge 182c, referred to herein as a hybrid edge 182c. The score of the hybrid edge 182c may depend on the scores of the relationship edge 182 and the observation edge 182a.

There may also exist multiple relationship edges between various nodes associated with each individual as they may interact with one another over a multitude of communication channels, such as through a variety of email addresses, phone numbers, social networks, physical addresses, etc. They may also have other connections to one another known to the relationship graph system. For example, node 172 and 176 may be connected by a relationship edge 186 representing an email from John Smith to Roy Rogers and a relationship edge 184 representing John Smith's contact information in Roy Roger's contact list.

These relationship edges 184, 186 may be summarized or collapsed into a single aggregate relationship edge between the two nodes 172 and 176 that have been chosen by the relationship graph system to represent John Doe and Roy Rogers. Information about the various relationship edges that contributed to this single aggregate relationship edge may be collapsed into a single score for this aggregate relationship edge or be fully represented in a collection of values in a vector associated with the one edge. Alternatively, all of the relationship edges between various nodes belonging to John Doe and Roy Rogers may simply be moved to the representative nodes such that all relevant relationship edges are maintained but are all moved to connect John's representative node, his personal email address node in this example, to Roy's representative cellphone number node.

Alternatively, the relationship graph system may choose to create new nodes as the representative nodes for John and Roy. For example, the relationship graph system may choose to assign a unique identifier, such as a unique integer or sequence of characters, to represent John and a different unique identifier to represent Roy. In this case relationship edges between the various nodes belonging to John and Roy may be summarized, collapsed, or moved to a new edge or set of edges connecting these two system-created representative nodes. The unique identifiers assigned to each individual may be randomly selected or alternatively may be derived from other identifying information for the individual including combinations of other associated nodes along with other identifying information for the individual. For example, the combination of John Doe's email address, phone number, and birth date may be determined by the relationship graph system to be a good choice as a unique identifier and representative node for John Due. Though generally intended to be relatively stable over time, the selection of representative node may change from time to time. In such cases, edges connected to a previous representative node may be moved to the newly selected representative node.

The relationship graph system may be queried to retrieve information on relationships between entities, including scores or rankings of relationships or computed social distances. For example, the relationship graph system may receive a query asking to list all of John Doe's relationships meeting a specified set of criteria, such as all of the people John knows at a specific company with whom he also has some sort of personal connection. A follow-up query may then ask the relationship graph system to find optimal communication paths for getting in touch with the individuals identified by the first query. For example, such query may generate a relationship A 190 between John Doe and Roy Rogers with 94% score and a relationship B 192 between John Doe and Jane Smith with a 68% score.

Other examples of queries include asking the relationship graph system to perform a network analysis on the relationship graph to return a set of top influencers, or social hubs, in a specified domain. Similarly, the relationship graph system may be queried to return a list of important individuals that should be added to someone's network, for example to grow a person's personal or professional network. Yet another example is a query for a list of an individual's connections that are becoming inactive and should be reestablished, for example to help an individual maintain and bolster their network over time. Those skilled in the art will recognize that a multitude of possible queries exist to inspect and interpret the graph of relationships and connected entities.

Figure 1B:
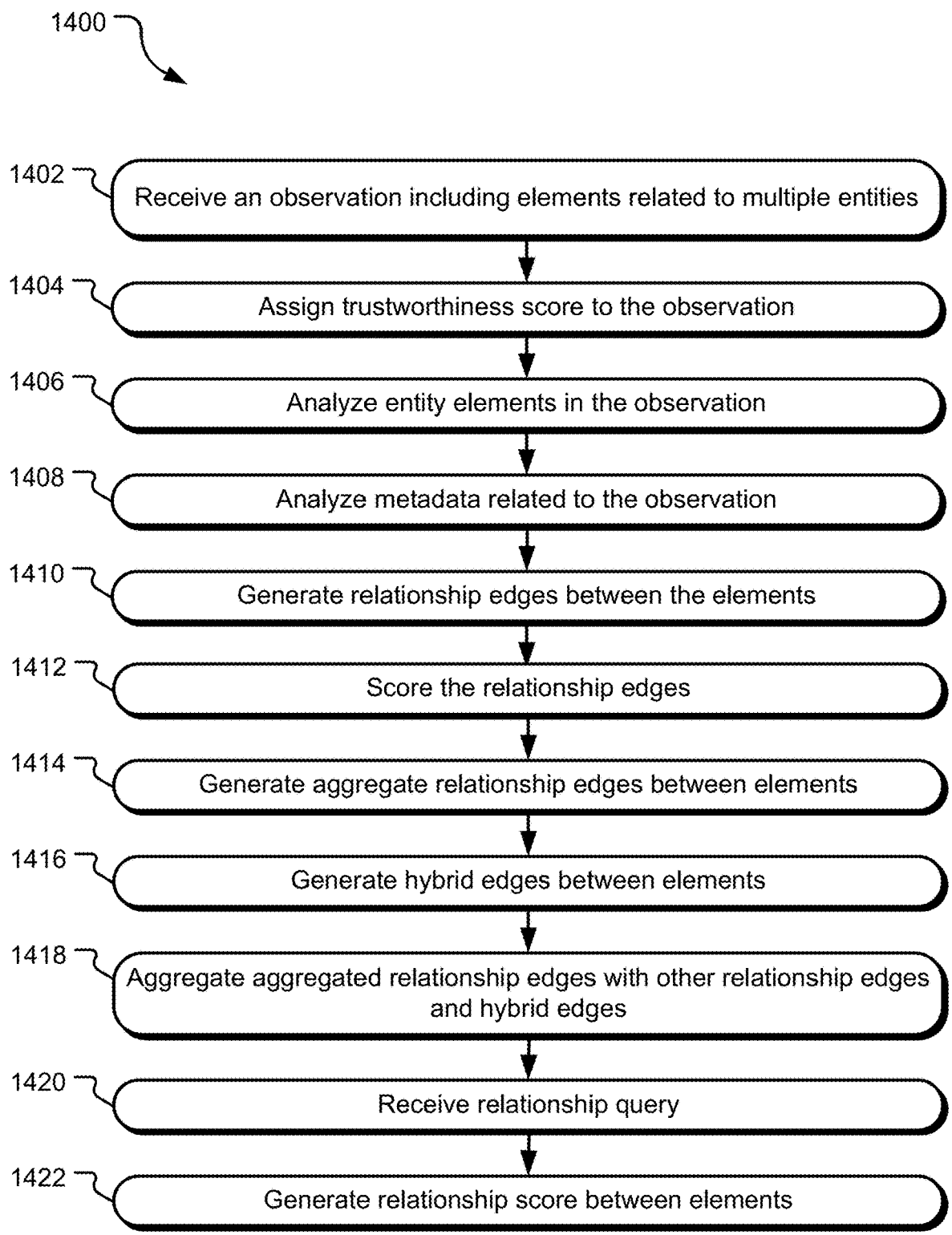
FIG. 1B illustrates example operations of a relationship graph system disclosed herein.

FIG. 1B illustrates various operations 1400 for generating relationships between entities based on analysis of various observations involving the entities. An operation 1402 receives an observation including elements related to multiple entities. For example, such an observation may be an email communication from John Doe (first entity) to Jane Smith (second entity) and may include email addresses of both entities as well as John Doe's phone number and address (various elements). An operation 1402 assigns a trustworthiness score to the observation. For example, if an email observation is a spam email, it is given a lower trustworthiness score. On the other hand, if an email address includes detailed personal message, it may be given a higher trustworthiness score.

An operation 1406 analyses the elements embedded or related to the observation, such as the sender's email address, the recipient's email address, any signature information, etc. An operation 1408 analyzes various metadata related to observation, such as the time and date of the observation, the subject matter of the observation, the context of the observation, etc. Using the information gathered by the operations 1406 and 1408, an operation 1410 generates relationship edges between the elements identified within the observation. For example, if the observation was an email from cgreen@blue.com to bblue@green.com, the operation 1410 generates a relationship edge between the elements from cgreen@blue.com and bblue@green.com. An operation 1412 assigns a score to such a relationship edge based on various inputs such as the trustworthiness score of the observation, various metadata (such as recency, urgency, context, etc.) related to the observation, etc.

An operation 1414 generates aggregate relationship edges between the elements. For example, if the elements cgreen@blue.com and bblue@green.com had a first relationship edge resulting from a direct email communication between these elements and a second relationship edge resulting from both of these elements existing in a common contact list, the operation 1414 generates an aggregate relationship edge between these two elements by collapsing the first relationship edge and the second relationship edge. The operation 1414 may also generate and assign a new score to the aggregate relationship edge based on the scores of the first and the second relationship edges. For example, such score of the aggregate relationship edge may be based on a Euclidian distance between the nodes. Alternatively, equations 1 or 2 (see below) may be used to calculate the score of the aggregate relationship edge.

An operation 1416 generates hybrid edges between various elements by collapsing the relationship edges (or aggregate relationship edges) with the observation edges between these elements. An operation 1418 may receive a query for a relationship between two entities. In response, an operation 1420 generates a relationship score between the two entities based on the score of various edges between the elements representing these entities and presents the relationship with the relationship score.

Figure 2:
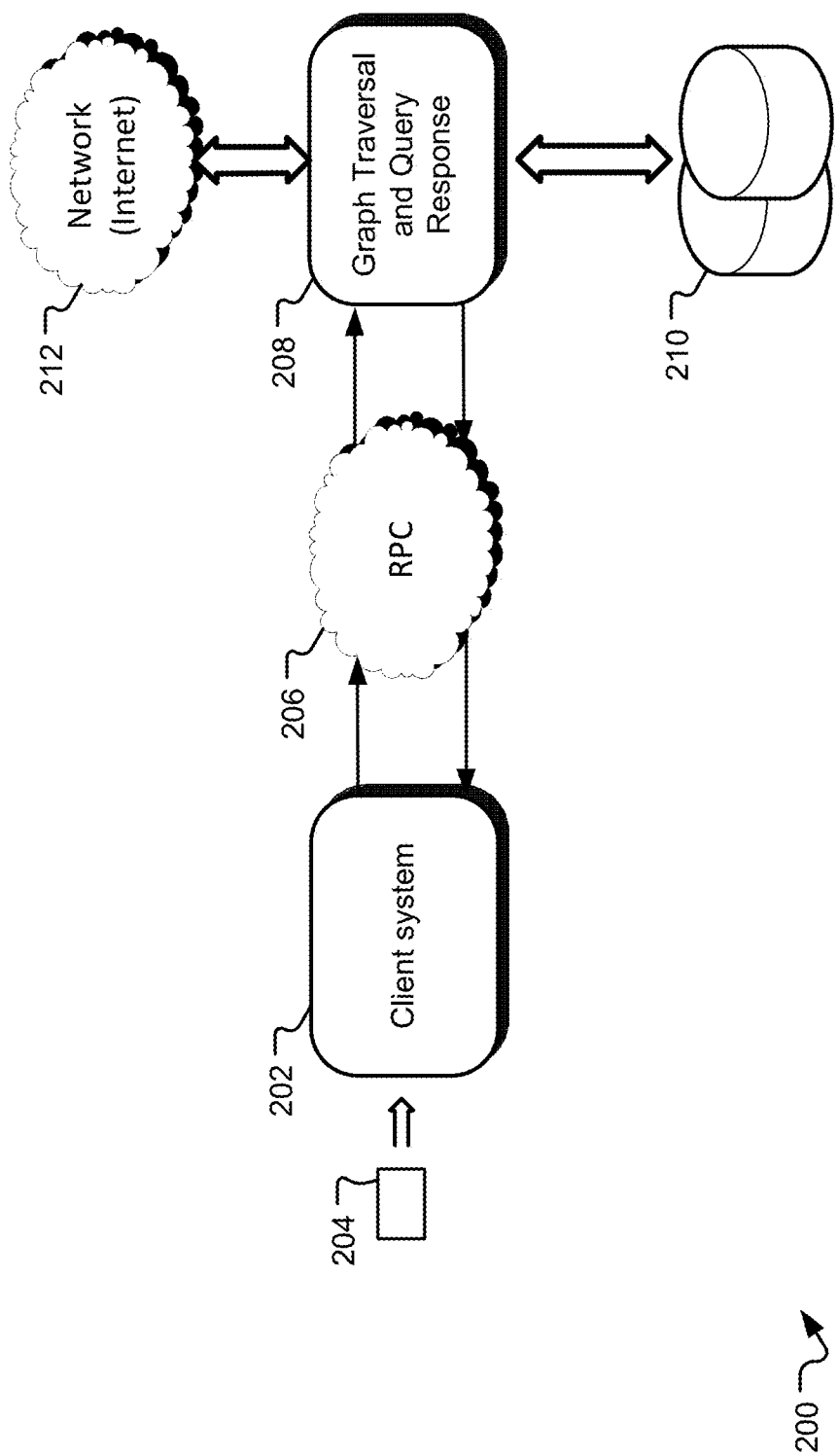
FIG. 2 illustrates an example block diagram representing the sources and flows of information in an information cataloging system disclosed herein.

FIG. 2 illustrates an example block diagram representing the sources and flows of information in an information cataloging system 200 disclosed herein. Specifically, FIG. 2 discloses an information cataloging system 200 that receives data from a number of different sources, catalogs the data using one or more methods disclosed herein, receives query from one or more client systems, and generates query responses. The information cataloging system 200 includes a client system 202 that receives information and/or builds queries. For example, the client system 202 may receive information from a user from a business card 204 where a user is interested in finding more information about the individual identified by the business card.

The client system 202 generates queries using the information from the business card. In one implementation, the query may be as simple as a request to find all information that may be found about the individual identified by the business card. In an alternate implementation, the query may be more complex, such as a request for verifying one or more pieces of information from the business card, etc. In one implementation, the client system can be, for example, and e-mail or contact database server, such as the Microsoft Outlook™ server. For example, a built in application from such an e-mail server may automatically send a query to the information cataloging system any time it receives an email from an unrecognized e-mail address. Alternatively, the client system 202 may be a front end API layer, such as a web API layer that allows a combination of multiple services to use the information cataloging service provided by the information cataloging system 200. In yet another alternative implementation, the client system 202 may be a mobile device server that receives data from various mobile devices, such as smartphones, tablet devices, etc. Alternatively, the client system 202 may itself be embedded into a mobile device, such that it may readily collect various observations about an entity from the mobile device.

The information cataloging system 200 also includes a remote procedure call (RPC) module 206 that breaks down the query generated by the client system 202. The RPC module includes a number of inter-process communication procedures or subroutines that may be executed in address space of another server on behalf of the client system 202. In one implementation, the RPC module 206 has the option to determine if the query submitted by the client system 202 itself has the merit to be used as an observation that will be used by the information cataloging system 200 as observations. For example, if the client system 202 submits information from the business card 204, the RPC module 206 may determine to update the corpus of observations used by the information cataloging system 200 with the newly issued query. Such adding of the query to the corpus of the observations may be done in real-time or in a batch mode.

In one implementation, the RPC module 206 may also determine which server to submit the procedure call in response to a query. For example, the information cataloging system 200 may be implemented in a cloud or distributed server environment where depending on the content of the query the remote procedure call may be directed to a different server. The RPC module may be responsible for storing and maintaining the proper indexing to route such remote procedure calls to appropriate servers.

The information cataloging system also includes a graph traversal and query response module 208 (hereinafter referred to as "traversal and response module") that performs the necessary graph traversals to keep the information cataloging system 200 up to date. In one implementation, the traversal and response module 208 processes the observations and its elements stored in the information cataloging system 200 to generate relational values between various nodes. For example, any time a new observation is received, the traversal and response module 208 may generate nodes and edges based on the elements of the observation, undertake graph traversal, calculations for the distances (confidence) of the edges of the graph, relate the nodes to existing nodes and edges, etc.

The traversal and response module 208 may also receive information from other network 212, such as for example, the Internet, etc. For example, the traversal and response module 212 may receive data feeds from the Internet resulting from pre-determined searches. In one implementation, in response to a query from the RPC module 206, the traversal and response module 208 may determine if it needs to perform a query in real-time. For example, if the traversal and response module 208 cannot generate a proper response to a query received from the RPC module 206, the traversal and response module 208 may determine to generate and send a real-time query to the network 212 using the query received from the RPC module 206.

In one implementation, the traversal and response module 208 may be configured to process the existing nodes and edges such that when a query is received from the RPC module 206, no new processing is necessary to generate the response to the query. In other words, the traversal and response module 208 may have already calculated all the edges related to each of the nodes and when a query matches a node, the results are generated based on the edges of such matching node and the distances thereof. The traversal and response module 208 is communicatively connected to databases 210 that stores the underlying observations, the nodes, the edges, etc. In one implementation, the database 210 may be implemented on a number of different servers or on a single database server. In one implementation, the database is implemented using a cloud based database sever. In an alternate implementation, the database 210 is implemented as a redundant distributed database.

The traversal and response module 208 generates the results in response to the query remote procedure call submitted by the RPC module 206 and returns the results to the client system 202. In one implementation, the client system 202 gets all the information that is generated in response to the query. In such an implementation, the client system 202 may decide what to do with the received information or how to further process the information. Thus, for example, in response to a query about an email address, the traversal and response module 208 sends information about all nodes that may be related to that email address node and the relative distance or confidence of each of the edges connecting the these nodes to the email node. In an alternative implementation, the traversal and response module 208 may use various threshold distance levels to determine what information is to be sent back to the client system 202. Yet alternatively, the traversal and response module 208 may merge all results of the query and send a combined response to the client system 202.

In an example illustration of the use of the information cataloging system 200, an email client 202 receives an email and sends a query to the RPC module 206. The RPC module 206 performs various remote procedure calls on the remote servers hosting the traversal and response module 208. The traversal and response module 208 performs the calls and determines values of all nodes, such as names, addresses, phone numbers, social networking accounts, etc., related to the email address. Subsequently, an updated profile or business card related to the email address is submitted to the email client 202. In one implementation, all of these steps are performed in real-time such that the email client 202 is able to return the business card received from the traversal and response module 208 with an email to an end user. In such an implementation, the traversal and response module 208 may also update the edge distances attached to the email address due to the additional inquiry regarding the email address.

Figure 3:
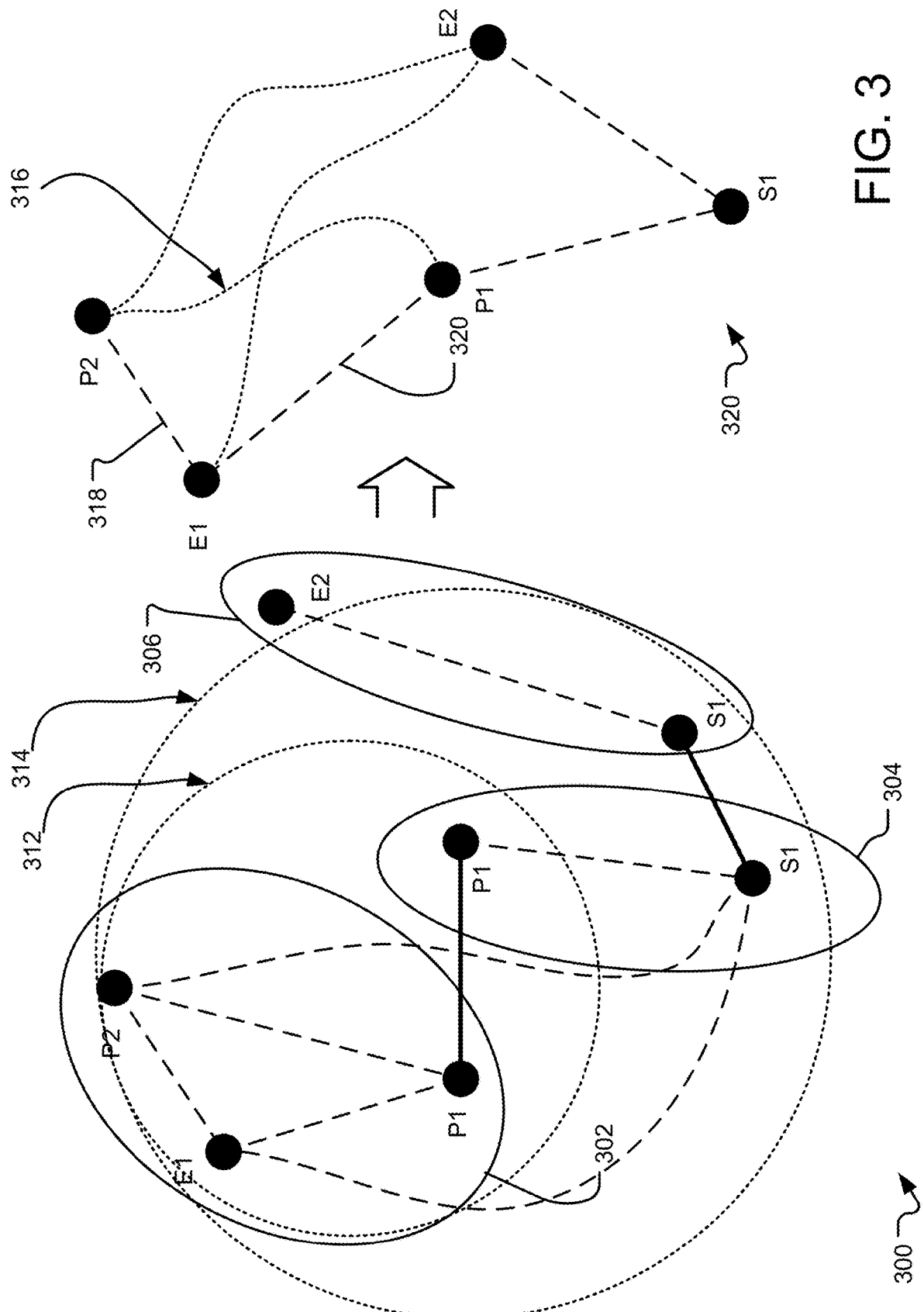
FIG. 3 illustrates an example directed graph representing various elements as nodes and their relationships as edges.

FIG. 3 illustrates an example directed graph representing various elements as nodes and their relationships as edges. Specifically, FIG. 3 illustrates a directed graph generated based on elements received from three different observations 302, 304, and 306. Each of the observations 302, 304, 306 includes one or more elements. For example, the observation 302 includes an e-mail address E1, and phone numbers P1 and P2, the observation 304 includes a phone number P1 and street address S1, whereas the observation 306 includes a street address S1 and an email address E2. The information cataloging system disclosed herein assigns nodes to each of the elements.

Subsequently, the information cataloging system assigns edges between the various nodes and assigns distances (or confidence) to the edges. These edges that are generated based on the observed relations are referred to as the observed edges. In one implementation, the information cataloging system assigns distances based on the confidence level assigned to the observations. For example, if the observation 302 is obtained from a well maintained CRM system, the system assigns smaller distances (higher confidence) between the nodes representing E1, P1, and P2. On the other hand, if the observation 306 is obtained as a result of an Internet search, a larger distance (lower confidence) is assigned between the nodes S1 and E2. Furthermore, the system may also update the distance between the nodes based on the age of the observation. Thus, as an observation gets old, the confidence in the edges based on that observation decreases. In one implementation, to achieve such reduction in confidence, in a vector representing the distance or confidence of an edge, each component representing a data type of a node related to the edge, an additional component representing the age may be assigned an imaginary value such that the Euclidean norm of the vector is reduced as the age of the edge increases. Thus, as the age increases, it will have a negative impact on the resulting confidence level. Other components of such a vector may represent the dimensions related to the edges that may have been used in computing the distance of the given edge. For example, if a first higher order edge connecting an e-mail address is generated using a second edge connecting the e-mail to a phone number and a third edge connecting the e-mail address to a mailing address, the other components of the first higher order edge will also include a phone component, a mailing address component, etc.

After assigning the node to various elements and determining the edges and the distances of the edges, the system initiates an iterative traversal to generate relation between various nodes. For example, the system may start traversing at point P2 and start traversing all the nodes within a first distance (as may be illustrated by the circle 312). In doing so, the system may reduce the amount of nodes within a given circle. For example, if the system notices that there are two nodes with high similarity the system may collapse these two nodes into one and re-compute the distances related to the collapsed node. For example, in the illustrated example, each of the observations 302 and 304 have node P1 and P1 with the same phone number. As a result, the system would collapse these two nodes into one node, as represented on the resulting graph on the right side of FIG. 3.

The system iteratively increases the size of the circle, from 312 to 314 and re-computes the edges, collapses the nodes as possible, etc. As shown in FIG. 3, when the circle is increased to 314, the nodes representing S1 from observations 304 and 306 are collapsed as well. The resulting directed graph 320 provides the relationships between the elements received from the observations 302, 304, and 306. Furthermore, the system may also compute the distances of the edges between the other nodes based on the re-computed confidence values assigned to the remaining edges and the confidence values. For example, the system may compute the distance of an edge 316 between P2 and P1 based on the distance of the edge 318 between P2 and E1 and another edge 320 between E1 and P1.

In one example implementation, the value of the edge 316 is computed as the Euclidian distance between P2 and P1 based on the distances of 318 and 320. In an alternate implementation, the distance of the edge 316 may be calculated as if the distance of the edges 318 and 320 are resistances of an electrical circuit, connected in parallel. For example, if the distance of 318 were d1 and the distance of 320 were d2, the distance of 316 d may be calculated using the following equation:

$$d=1/(1/d1+1/d2) \qquad \text{Eq. 1}$$

Alternatively:

$$d=(d1*d2)/(d1+d2) \qquad \text{Eq. 2}$$

In yet alternative implementation, the system traverses through the different nodes in a speculative traversal mode. For example, the system may first traverse through the nodes of the observation 302 and subsequently, it selects one of the nodes, such as P1 to traverse to other nodes near P1 for a few iterations. In such an implementation, the system iterates from node P1 of observation 302 to node P2 of the observation 304 to node S1 of the observation 304 to node S1 of observation 306, etc. As the system iterates from P1 to P1 to S1, etc., the system collapses nodes as necessary and assigns new confidence values to the nodes and distances to the edges between the remaining nodes.

Figure 4:
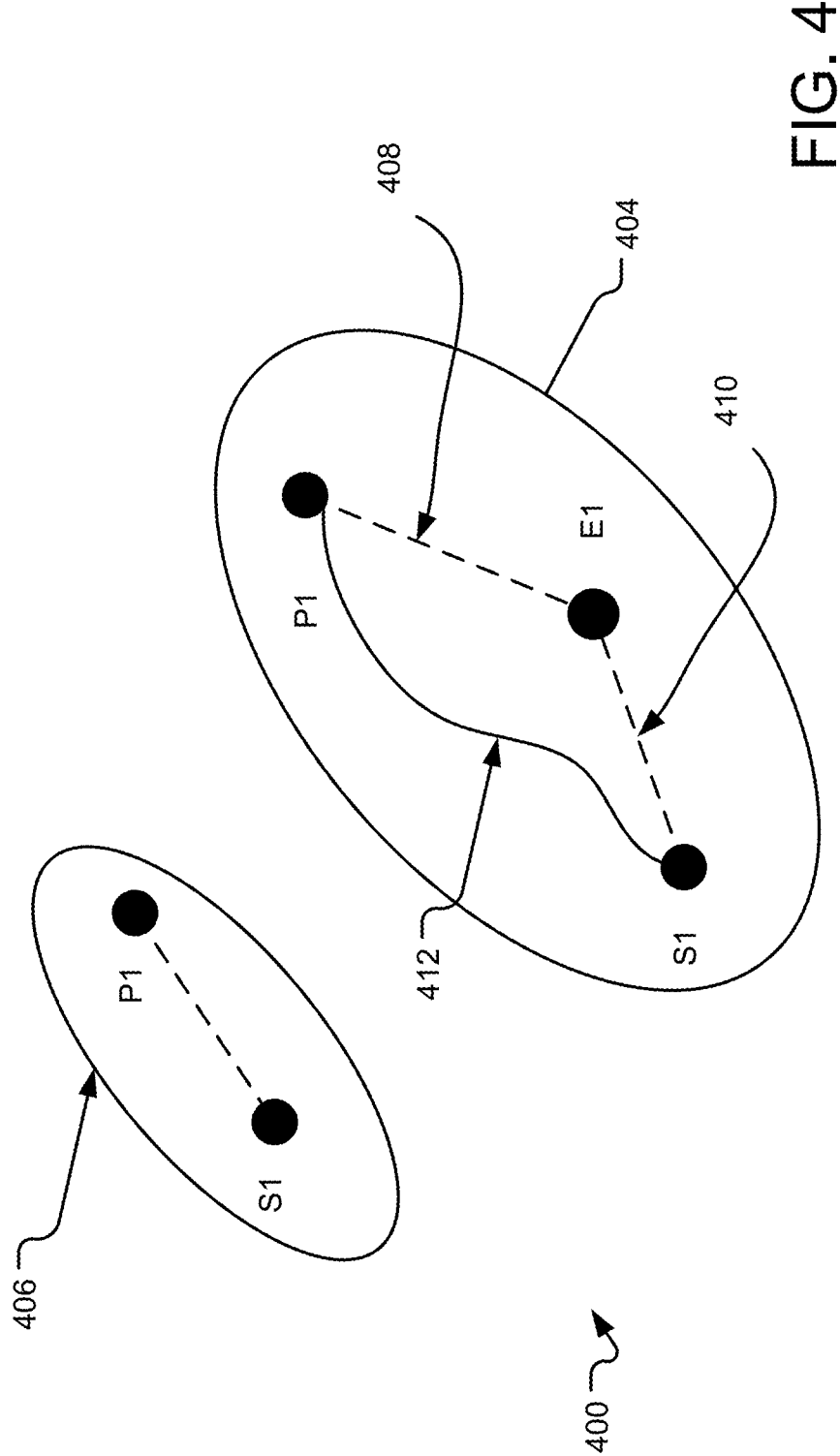
FIG. 4 illustrates an alternative example of directed graph illustrating edge traversal through the directed graph.

FIG. 4 illustrates an alternative example of directed graph 400 illustrating edge traversal through the directed graph. Specifically, FIG. 4 illustrates an observation 404 having nodes P1, E1 and S1. If the distance of the edge 408 between P1 and E1 were 3 and the distance of the edge 410 between E1 and S1 were 2, the distance d of the edge 412 between P1 and S1 may be calculated as:

$$d=1/(1/3+1/2)=6/5$$

However, if the system recognizes another observation 406 that gives the direct distance between P1 and S1 as 1, the system collapses the node P1 from observation 404 with node P1 from observation 406 and it collapses the node S1 from observation 404 with node S1 from the observation 406. In this case, the distance between P1 and S1 is recalculated as follows:

$$D=(1+6/5)=11/5$$

Thus, when the system finds two edges connecting given two nodes, it re-computes the distance between those two nodes as if those two edges were two resistors of an electrical circuit, connected in series.

FIG. 5 illustrates an example block diagram 500 representing operations for noise suppression related to a node in the directed graph. For example, if a node has multiple dissimilar associations to different nodes of the same type (noise), the value assigned to each of the nodes is reduced. Thus, for example, if a phone number is assigned to five different names, it is likely that the phone number is not a personal phone number but the phone number for a company's main line. In this case, the value assigned to the edge between the phone number and each of the five nodes identifying the names is assigned a lower value.

If the system observes such multiple dissimilar associations, the system adds a noise value to the node. For example, if the system discovers that node P, representing a phone number, is attached to five names N1-N5, representing names, it determines that at least one or more of the edges connecting the node P to the nodes N1-N5 represents noise. For example, the phone number P is likely the main office phone number for each of the users represented by nodes N1-N5. In such case, the system adds a noise value to the node P. In such example, the system first calculates the noise value to be added to node P based on the distances of each edges connecting the node P to the nodes N1-N5 and stores the noise value with node P.

The value of the noise attached to a node is opposite in effect to the value of confidence attached to that node. For example, if the confidence value attached to a node is considered to be a signal, the noise attached to the node allows the system to calculate a signal-to-noise (SNR) ratio attached to that node. Subsequently, the noise value as well as the SNR may be propagated to other nodes attached to the node. Thus, if the node P were attached to another node E, representing an email, the noise attached to the node P and the SNR of the node P may be propagated to the node E. When SNR is carried from node P to node E, it is carried in the opposite manner compared to the carrying of the value of the signal from the node P to node E. Thus, while the signal is added inversely, the noise is added linearly when the noise is transferred from a node P to a node E. Thus, the noise attached to a node has an effect of increasing the distance of the edge (thus decreasing the confidence).

Subsequently, the noise attached to a node can also be used in calculating the noise and the SNR of an edge connecting that particular node to another node. In one implementation, a threshold value of noise or SNR attached to each edge may be used to determine if that edge represents a valid relation between two nodes. For example, the system may determine that an SNR above threshold is acceptable to represent a valid relationship. Empirically, it is found that an SNR of 0.7 or above represents a valid relationship between two nodes. Thus, if the SNR of an edge between two nodes is below 0.7, that edge may not represent a valid relationship.

Figure 6:
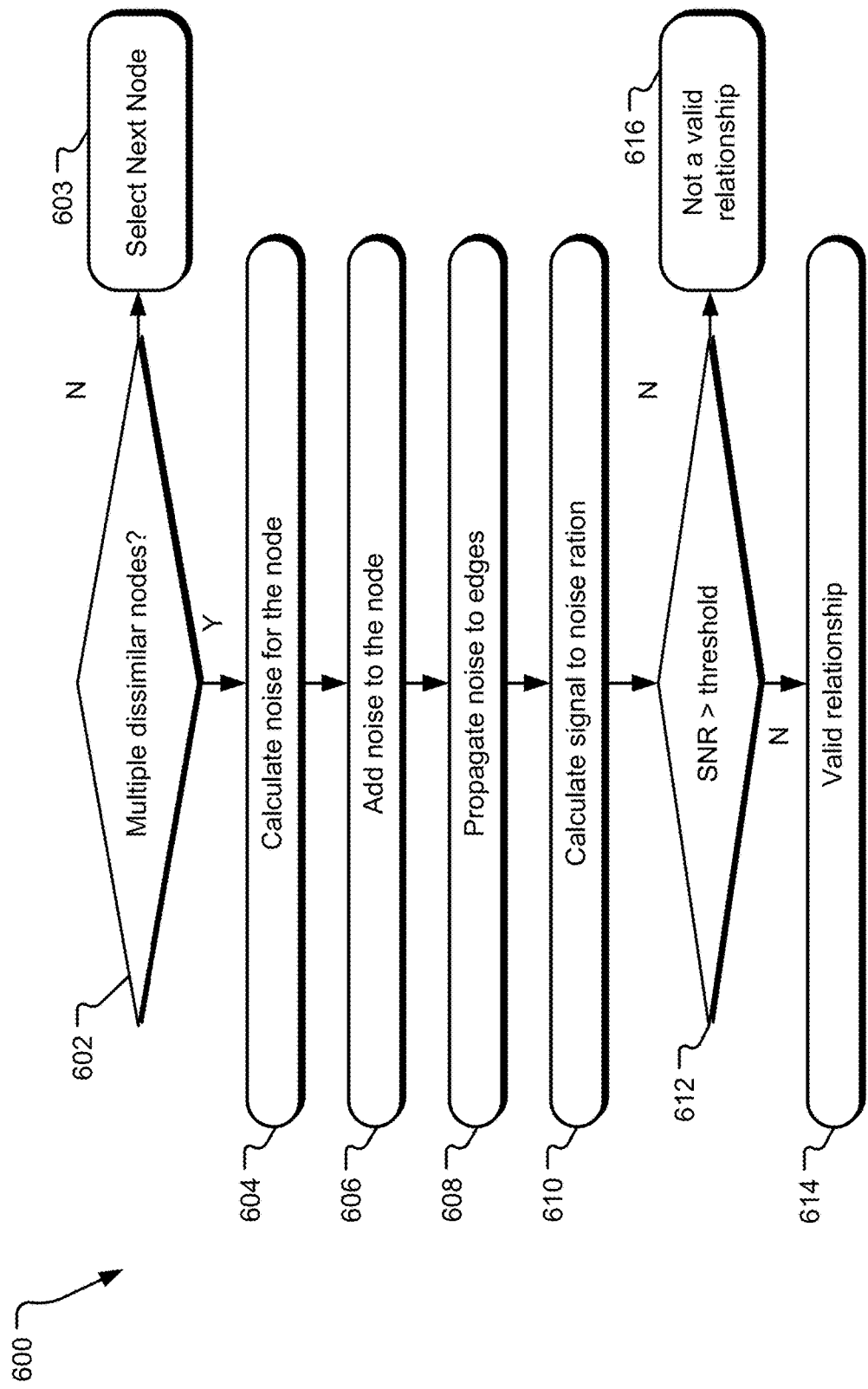
FIG. 6 illustrates an alternative example flow diagram representing operations of the information cataloging system disclosed herein.

FIG. 6 illustrates an example flow diagram 600 representing operations of the information cataloging system that also uses the SNR related to nodes in determining if edges represent valid relationship. Specifically, a comparing operation 602 determines if a node is connected to multiple dissimilar nodes. For example, a node representing a company's main phone line may be connected to each employee's name. Subsequently, a calculating operation 604 calculates the noise for the node based on the multiple dissimilar nodes and the distances to such nodes. An adding operation 606 adds the noise to the node. The noise is propagated to the other edges connected to the node by an operation 608. Another calculating operation 610 calculates the SNR for various nodes.

An operation 612 compares the SNR to a threshold to determine if an edge represents a valid relationship between two nodes. If the SNR is above a threshold, an operation 614 determines that edge to represent a valid relationship.

In an alternate implementation, calculating the noise related to given node may comprise determining the degree of overlap between the given node's immediate neighboring nodes and the degree of equivalence among each neighboring nodes' neighbors. For example, if node A has a neighboring nodes B and C, the noise of node A will also depend on the commonality of neighbors for nodes B and C. Thus, if each of the nodes B and C had many neighboring nodes that are similar to each other, then the noise for node A will be lower. However, if there was little overlap in the neighboring nodes to nodes B and C, the noise assigned to node A will be higher.

Such calculation of noise based on the degree of overlap between the given node's immediate neighboring nodes and the degree of equivalence among each neighboring nodes' neighbors is further illustrated with respect to the directed graph 500a of FIG. 5. Specifically, the noise at node N4 is connected to nodes N4-1 and N4-2, wherein if the nodes N4-1 and N4-1 are highly similar to each other, then the noise attributed to node N4 is lower. On the other hand, if the nodes N2-1 and N2-2 connected to the node N2 are highly dis-similar, the noise assigned to node N2 is higher. Furthermore, if two nodes N2 and N3 are connected to the same node N2-2, the noise attributed to each of the nodes N2 and N3 will be lower.

Figure 7:
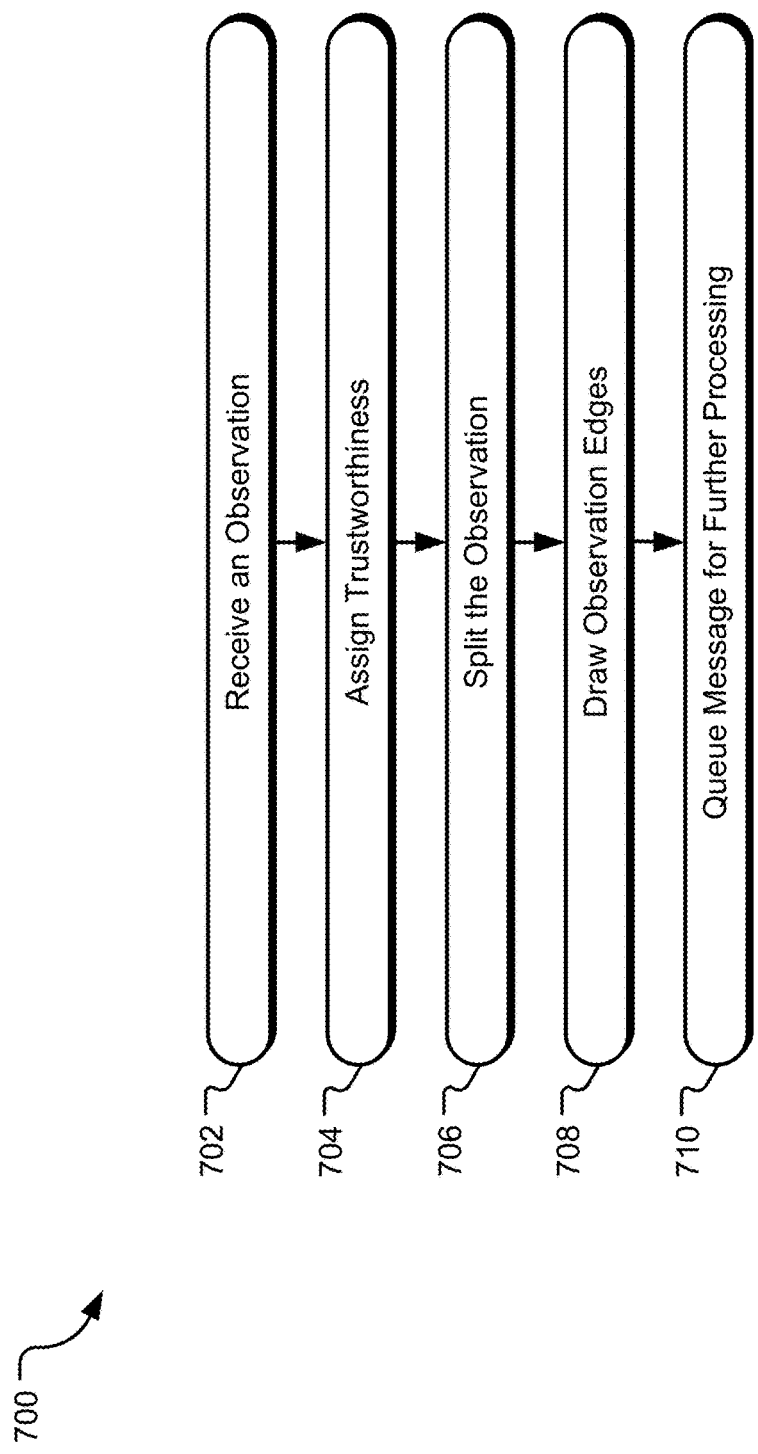
FIG. 7 illustrates an example flowchart for cataloging of a new observation record.

FIG. 7 illustrates an example flowchart 700 for cataloging of a new observation record. At operation 402, a new observation arrives at time 1306301770833 from source src-823723 containing:
   a. primary work email: jane@janedoe.com
   b. given name: Jane
   c. family name: Doe
   d. mobile phone: 303.123.4567

An operation 704 assigns trustworthiness to the entire observation. For example, we'll use 0.5. Subsequently, a splitting operation 706 splits the Observation into normalized ContactFields and save in a database using row keys:
   a.  email:work:primary:com.janedoe@jane:src-823723: 1306301770833
   b. name:given:Jane:src-823723:1306301770833
   c. name:family:Doe:src-823723:1306301770833
   d.         phone:mobile:13031234567:src-823723: 1306301770833

An operation 708 draws "same observation" edges to create an isolated sub graph. For example the outbound edges from the email vertex are shown below. Edge weight is computed by multiplying the observation's trustworthiness by a fixed set of "typed weightings". This allows email→name to be stronger than name→email.
   a. name:given:Jane:src-823723:1306301770833=0.5
   b. name:family:Doe:src-823723:1306301770833=0.5
   c.        phone:mobile:13031234567:src-823723: 1306301770833=0.3
      i. i.e. this would be "email to mobile phone is always weighted 0.6" multiplied by the Observation's 0.5

For each ContactField, a queuing operation 710 queues a message to discover and record semantically equivalent vertices.

Figure 8:
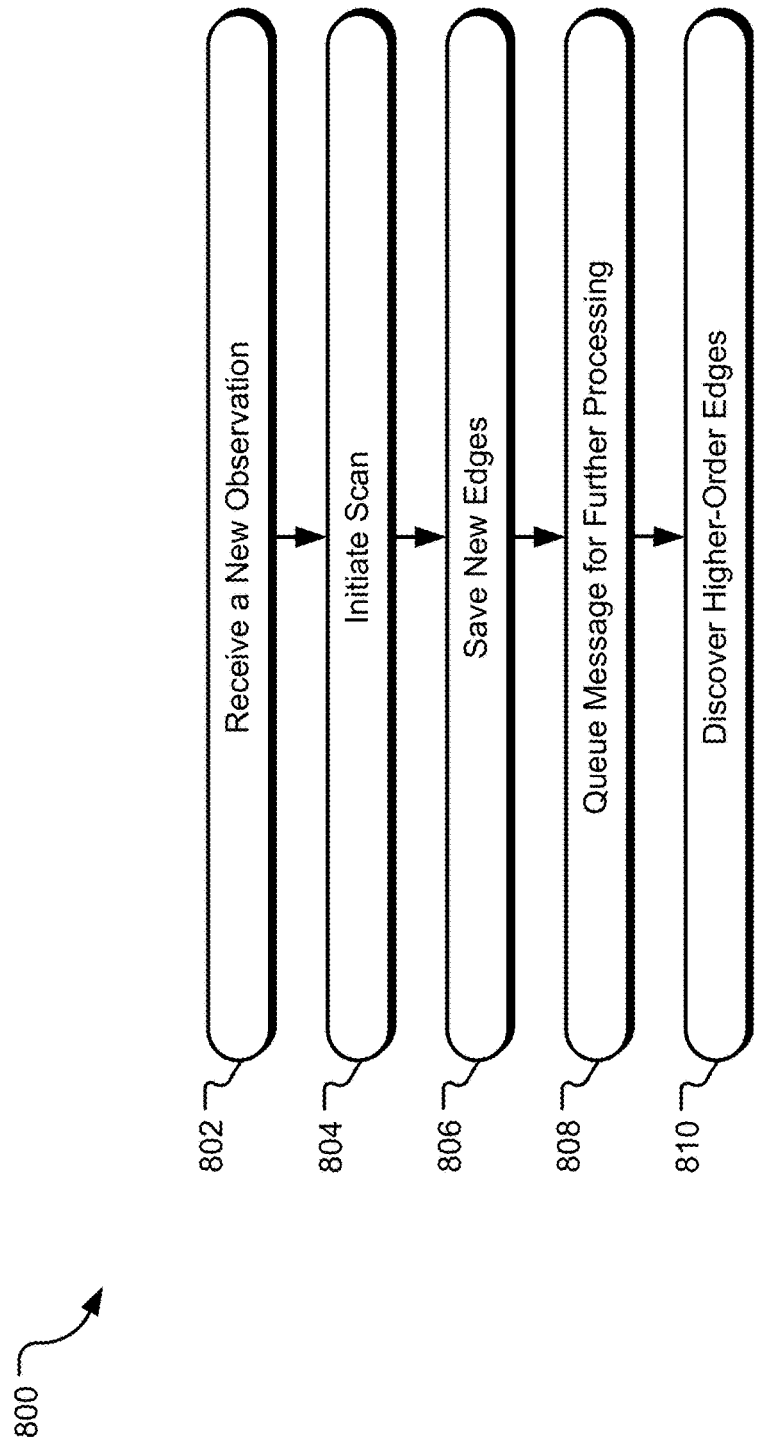
FIG. 8 illustrates an example flowchart for discovering edges for existing observation records.

FIG. 8 illustrates an example flowchart 800 for discovering edges for existing observation records. A receiving operation 802 Receive a message to discover equivalent edges of:
   email:work:primary:com.janedoe@jane:src-823723: 1306301770833

An initiating operation 804 initiates a database scan starting at:
   email:work:primary:com.janedoe@jane, pulling back columns from the "equivalent edge" column family.

For each discovered row where an edge does not exist, a saving operation 506 saves two new edges pointing in either direction, weighting them according to some globally-configurable "semantic equivalence" weight. This joins the sub-graph to the rest of the graph.

A queuing operation 808 queues a message to walk from:
   email:work:primary:com.janedoe@jane:src-823723: 1306301770833,
discovering and saving new nodes.

A discovering operation 810 receives a message to discover higher order edges
   A. Should this be at the "observation" level
   B. or the "contact field" level?

Figure 9:
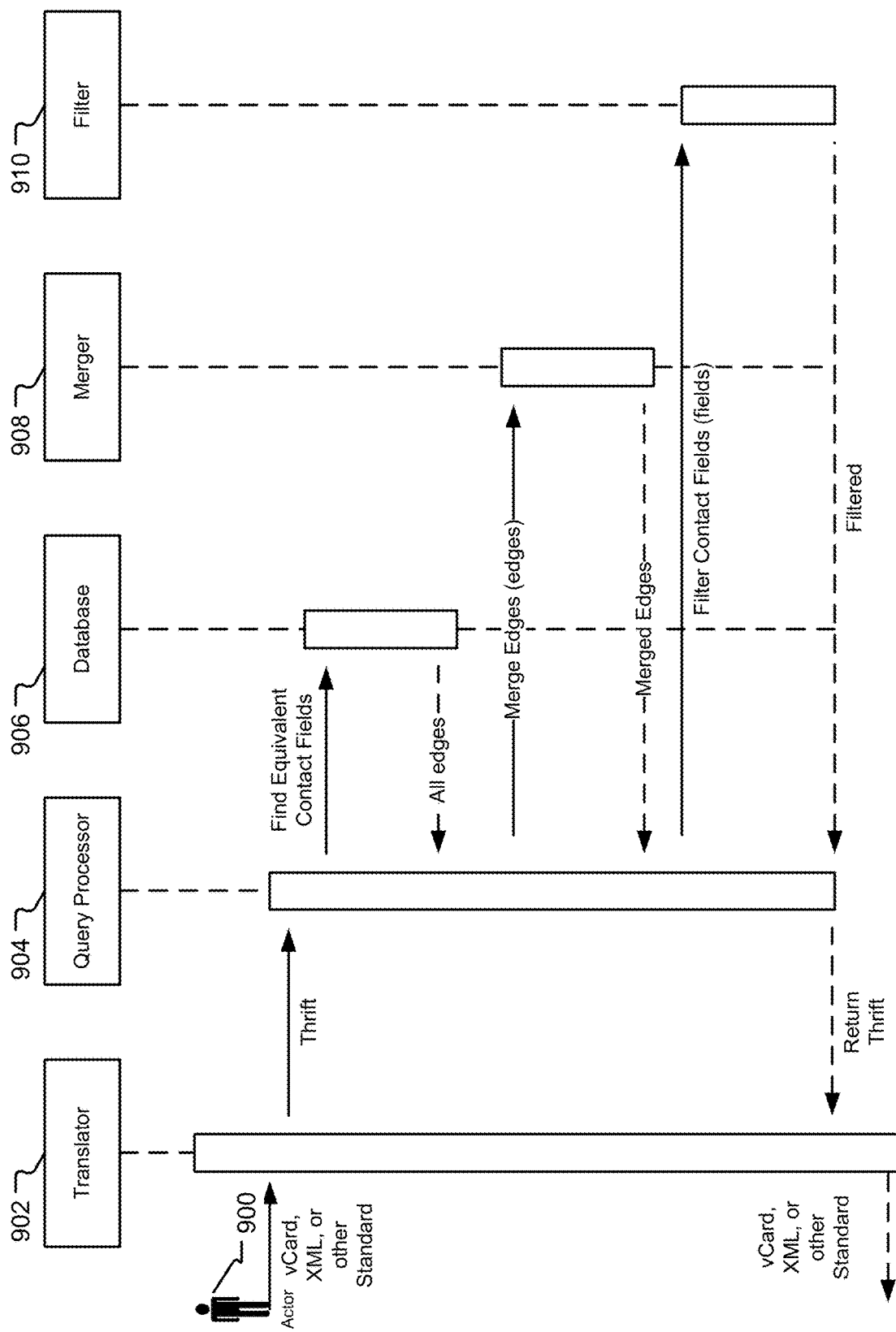
FIG. 9 illustrates an example of data sources and flows for querying information cataloging system.

FIG. 9 illustrates an example of data sources and flows for querying information cataloging system. As illustrated in FIG. 9, an actor 902 queries the system by sending a vCard, XML, JSON, or other standardized format. This format is converted into an internal representation, which is then sent to a Query Processor 904. The Query Processor 904 queries a database 906 looking for contact fields, which are semantically equivalent to the fields present in the query. If equivalent contact fields are found, the query processor 904 finds each field's associated higher-order edges (In one implementation, higher order edges are stored by the database row key, which means that for a semantically-equivalent contact field, the system will have fast access to all pre-computed higher-order edges).

These higher-order edges are returned to the Query Processor 904 along with a confidence factor for each edge. The edges are then sent to the Merger 908, which combines edges into semantically-unique destination fields non-linearly adding each edge's confidence factor. These merged edges are then returned to the Query Processor 904.

The contact fields are then sent to a filter 910 where data elements are filtered out. Data below certain confidence factors might be filtered out, or data that should not be returned to the actor for a variety of reasons, including data sensitivity or privacy concerns. The filtered data is returned to the Query Processor 904.

The model is returned to the Translator 902 and finally returned to the Actor 900 as a vCard, XML, JSON, or other standardized format.

Figure 10:
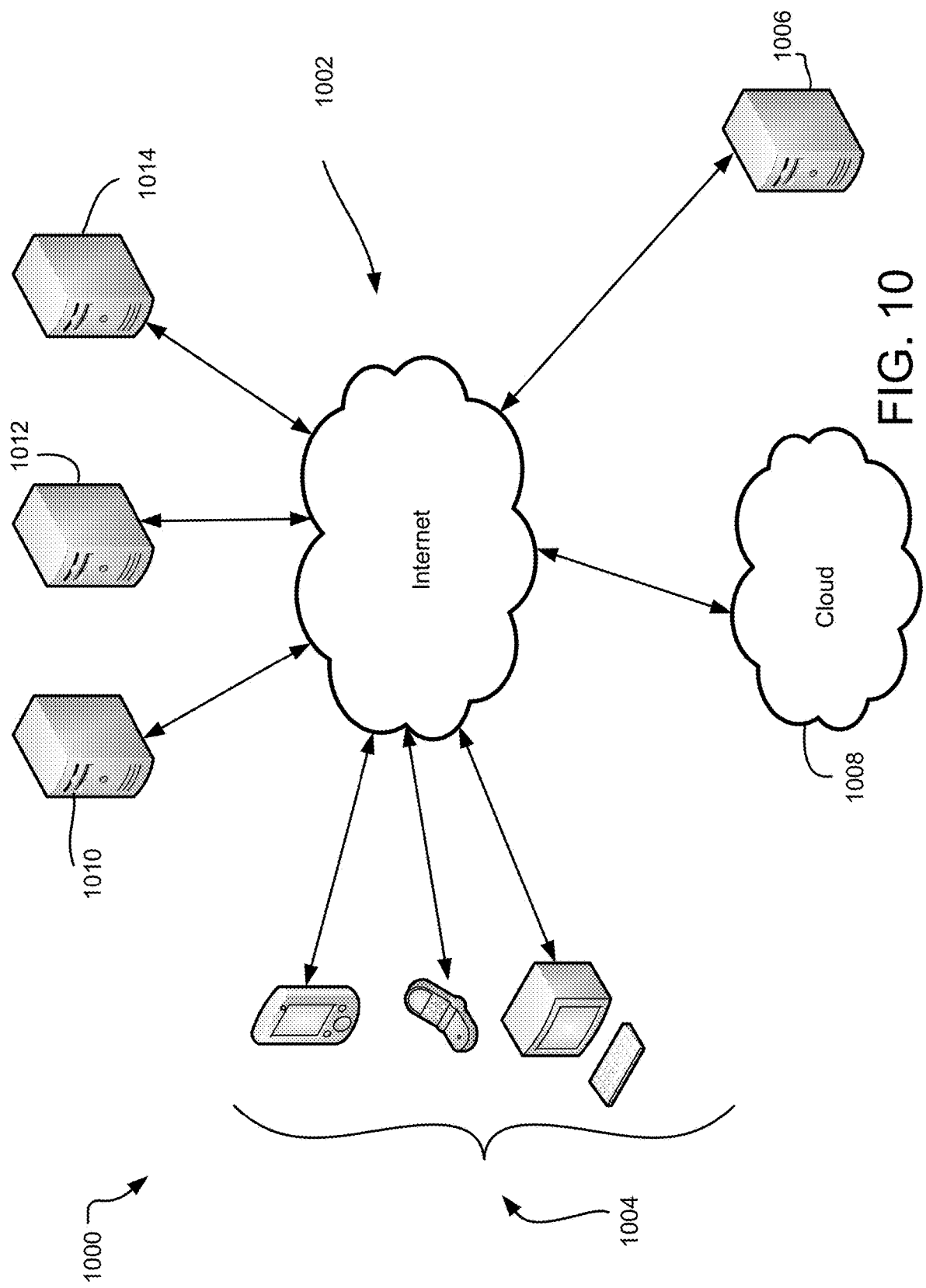
FIG. 10 illustrates an example network environment for implementing the information cataloging system disclosed herein.

FIG. 10 illustrates an example network environment 1000 for implementing the system for information cataloging as described herein. Specifically, FIG. 10 illustrates a communications network 1002 (e.g., the Internet) that is used by one or more computing or data storage devices for implementing the system for information cataloging. In one implementation, one or more user devices 1004 are communicatively connected to the communications network 1002. Examples of the user devices 1004 include a personal computer, a laptop, a smart-phone, tablet or slate (e.g., iPad), etc. A user interested in the information cataloging uses such user devices 1004 to access the system for information cataloging.

Figure 11:
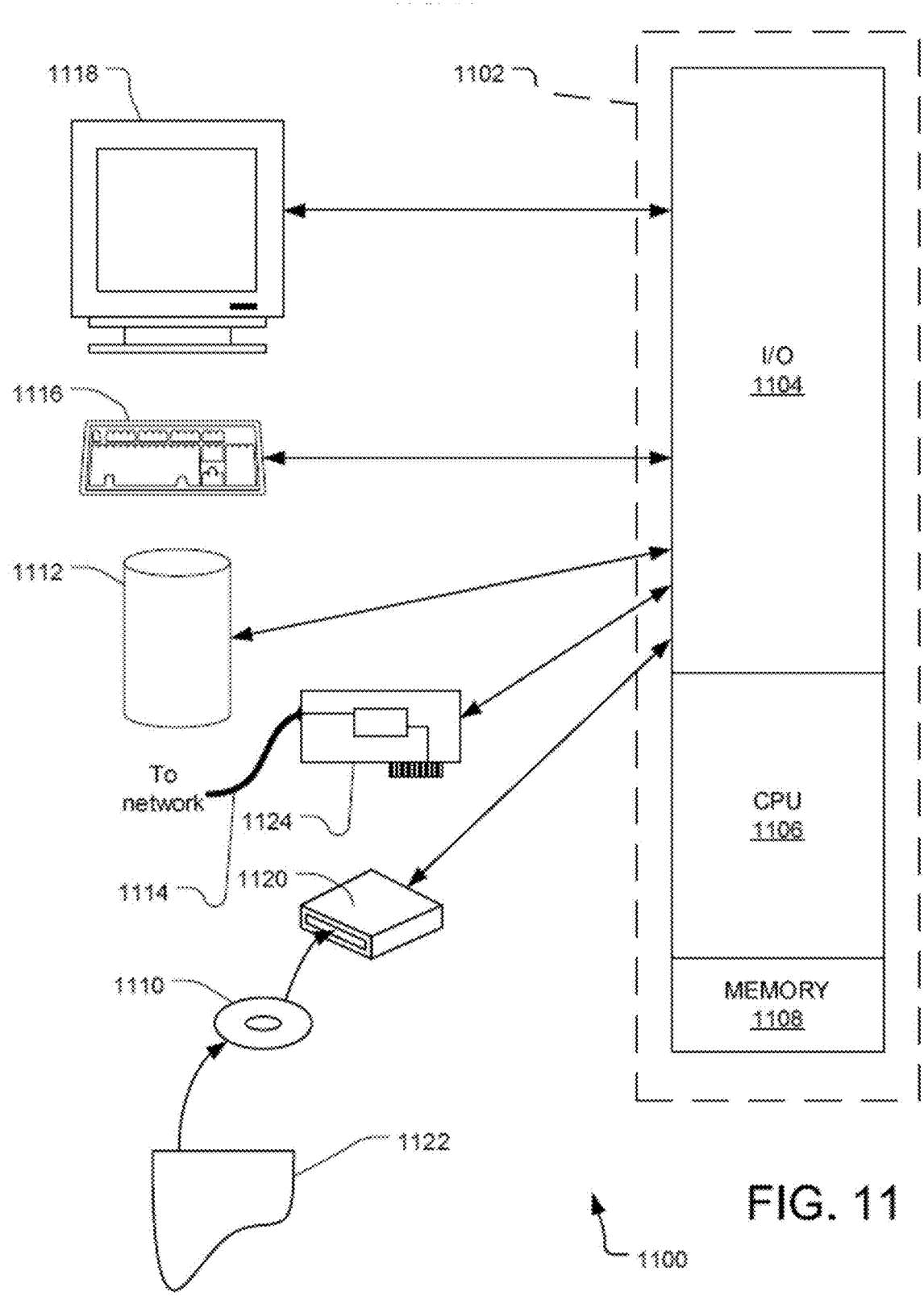
FIG. 11 illustrates an example computing system that can be used to implement the information cataloging system disclosed herein.

FIG. 11 illustrates an example computing system that can be used to implement one or more components of the information cataloging method and system described herein. A general-purpose computer system 1100 is capable of executing a computer program product to execute a computer process. Data and program files may be input to the computer system 1100, which reads the files and executes the programs therein. Some of the elements of a general-purpose computer system 1100 are shown in FIG. 11, wherein a processor 1102 is shown having an input/output (I/O) section 1104, a Central Processing Unit (CPU) 1106, and a memory section 1108. There may be one or more processors 1102, such that the processor 1102 of the computer system 1100 comprises a single central-processing unit 1106, or a plurality of processing units, commonly referred to as a parallel processing environment. The computer system 1100 may be a conventional computer, a distributed computer, or any other type of computer such as one or more external computers made available via a cloud computing architecture. The described technology is optionally implemented in software devices loaded in memory 1108, stored on a configured DVD/CD-ROM 1110 or storage unit 1112, and/or communicated via a wired or wireless network link 1114 on a carrier signal, thereby transforming the computer system 1100 in FIG. 11 to a special purpose machine for implementing the described operations.

The I/O section 1104 is connected to one or more user-interface devices (e.g., a keyboard 1116 and a display unit 1118), a disk storage unit 1112, and a disk drive unit 1120. Generally, in contemporary systems, the disk drive unit 1120 is a DVD/CD-ROM drive unit capable of reading the DVD/CD-ROM medium 1110, which typically contains programs and data 1122. Computer program products containing mechanisms to effectuate the systems and methods in accordance with the described technology may reside in the memory section 1104, on a disk storage unit 1112, or on the DVD/CD-ROM medium 1110 of such a system 1100, or external storage devices made available via a cloud computing architecture with such computer program products including one or more database management products, web server products, application server products and/or other additional software components. Alternatively, a disk drive unit 1120 may be replaced or supplemented by a floppy drive unit, a tape drive unit, or other storage medium drive unit. The network adapter 1124 is capable of connecting the computer system to a network via the network link 1114, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, smart-phones, gaming consoles, set top boxes, tablets or slates (e.g., iPads), etc.

When used in a LAN-networking environment, the computer system 1100 is connected (by wired connection or wirelessly) to a local network through the network interface or adapter 1124, which is one type of communications device. When used in a WAN-networking environment, the computer system 1100 typically includes a modem, a network adapter, or any other type of communications device for establishing communications over the wide area network. In a networked environment, program modules depicted relative to the computer system 1100 or portions thereof, may be stored in a remote memory storage device. It is appreciated that the network connections shown are exemplary and other means of and communications devices for establishing a communications link between the computers may be used.

Further, the plurality of internal and external databases, data stores, source database, and/or data cache on the cloud server are stored as memory 1108 or other storage systems, such as disk storage unit 1112 or DVD/CD-ROM medium 1110 and/or other external storage device made available and accessed via a cloud computing architecture. Still further, some or all of the operations for the system for information cataloging disclosed herein may be performed by the processor 1102. In addition, one or more functionalities of the system disclosed herein may be generated by the processor 1102 and a user may interact with these GUIs using one or more user-interface devices (e.g., a keyboard 1116 and a display unit 1118) with some of the data in use directly coming from third party websites and other online sources and data stores via methods including but not limited to web services calls and interfaces without explicit user input.

A server 1206 hosts the system for information cataloging. In an alternate implementation, the server 1206 also hosts a website or an application that users visit to access the system for information cataloging. Server 1206 may be one single server, or a plurality of servers with each such server being a physical server or a virtual machine or a collection of both physical servers and virtual machines. Alternatively, a cloud 1208 hosts one or more components of the system for information cataloging. The user devices 1204, the server 1206, the cloud 1208, as well as other resources connected to the communications network 1202 access one or more of servers 1210, 1212, and 1214 for getting access to one or more websites, applications, web service interfaces, etc., that are used in information cataloging. In one implementation, the server 1206 also hosts a search engine that is used by the system for accessing the system for information cataloging and to select one or more services used in information cataloging.

Figure 12:
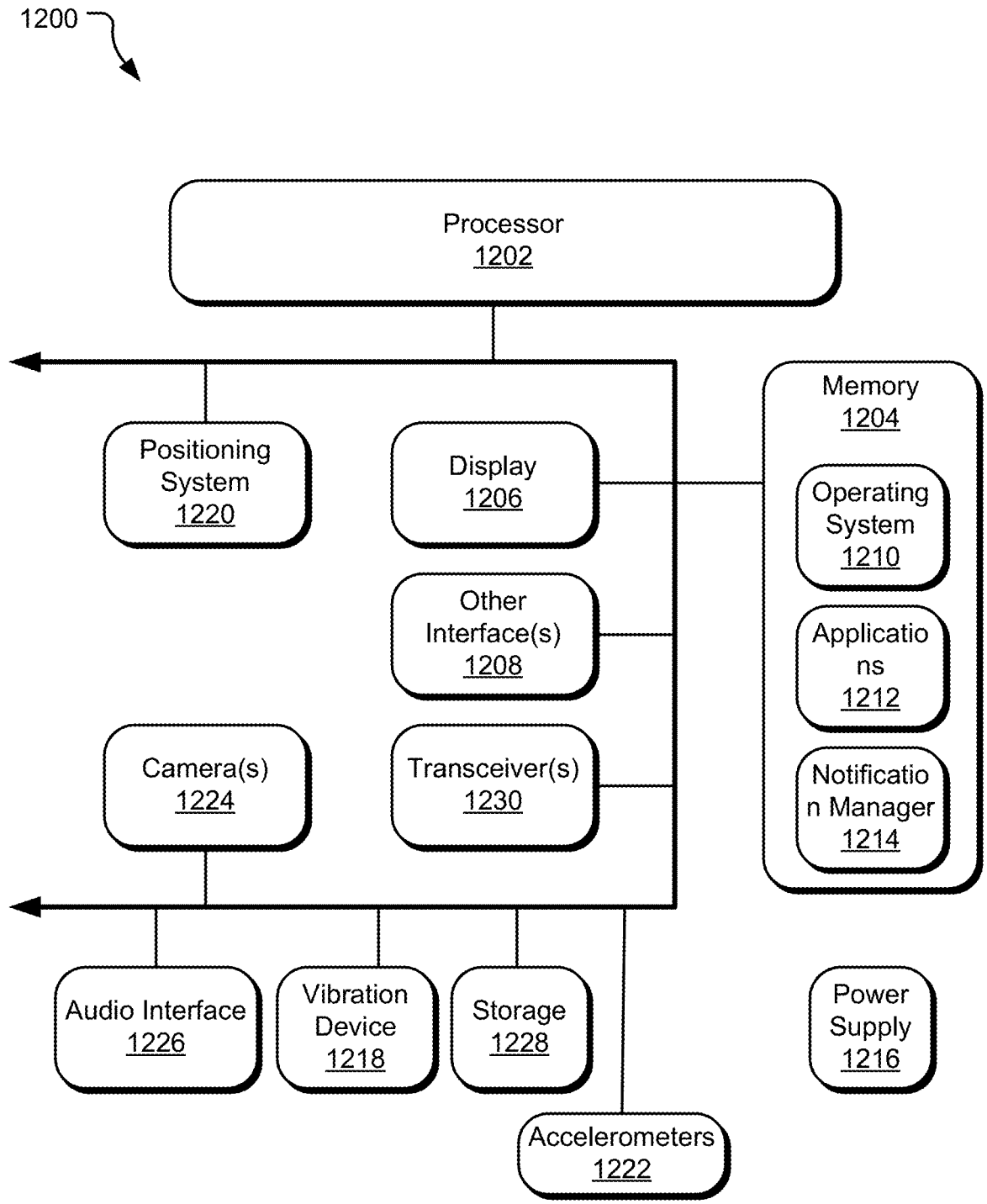
FIG. 12 illustrates an example mobile computing device that can be used to implement one or more components of the information cataloging system disclosed herein.

FIG. 12 illustrates an example mobile computing device 1200 that can be used to implement one or more components of the information cataloging system disclosed herein. Specifically, the mobile computing device 1200. The mobile device 1200 includes a processor 1202, a memory 1204, a display 1206 (e.g., a touchscreen display), and other interfaces 1208 (e.g., a keyboard). The memory 1204 generally includes both volatile memory (e.g., RAM) and non-volatile memory (e.g., flash memory). An operating system 1210, such as the Microsoft Windows® Phone 7 operating system, resides in the memory 1204 and is executed by the processor 1202, although it should be understood that other operating systems may be employed.

One or more application programs 1212 are loaded in the memory 1204 and executed on the operating system 1210 by the processor 1202. Examples of applications 1212 include without limitation email programs, scheduling programs, personal information managers, Internet browsing programs, multimedia player applications, etc. In one implementation, an information cataloging application stored in the memory 1204 may be used to catalog various observations stored on the mobile device 1200, such as e-mail addresses from the e-mail application of the mobile device, the contacts from a contact management application stored on the mobile device 1200, etc. In yet alternate implementation, a client application stored in the memory 1204 of the mobile device 1200 may generate queries using the information stored on the mobile device 1200, receive entity relation information from a server generating relations between various elements, and display updated observations to a user of the mobile device 1200. A notification manager 1214 is also loaded in the memory 1204 and is executed by the processor 1202 to present notifications to the user. For example, when a promotion is triggered and presented to the shopper, the notification manager 1214 can cause the mobile device 1200 to beep or vibrate (via the vibration device 1218) and display the promotion on the display 1206.

The mobile device 1200 includes a power supply 1216, which is powered by one or more batteries or other power sources and which provides power to other components of the mobile device 1200. The power supply 1216 may also be connected to an external power source that overrides or recharges the built-in batteries or other power sources.

The mobile device 1200 includes one or more communication transceivers 1230 to provide network connectivity (e.g., mobile phone network, Wi-Fi®, BlueTooth®, etc.). The mobile device 1200 also includes various other components, such as a positioning system 1220 (e.g., a global positioning satellite transceiver), one or more accelerometers 1222, one or more cameras 1224, an audio interface 1226 (e.g., a microphone, an audio amplifier and speaker and/or audio jack), and additional storage 1228. Other configurations may also be employed.

Embodiments of the present technology are disclosed herein in the context of an information cataloging system. In the above description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application—and business-related constraints, and that those specific goals will vary from one implementation to another and from one developer to another.

According to one embodiment of the present invention, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages, and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present technology, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A computer implemented method comprising:
    detecting, by one or more hardware processors of an information cataloging system, a plurality of observations including various elements related to different entities;
    representing the one or more of various elements as nodes in a graph in the information cataloging system executed by one or more hardware processors by storing the observations in a database;
    representing, using the one or more hardware processors of the information cataloging system, relations between one or more nodes as relation edges in the graph;
    assigning, using the one or more hardware processors of the information cataloging system, confidence levels to one or more of the plurality of nodes;
    assigning, using the one or more hardware processors of the information cataloging system, a score to each relationship edge based on metadata related to the relations represented by the relationship edge;
    computing, using the one or more hardware processors of the information cataloging system, confidence values for one or more of the relationship edges based on confidence levels assigned to the nodes associated with the edges and the score assigned to each of the relationship edges;
    traversing the graph using the one or more hardware processors of the information cataloging system to identify a related plurality of the nodes and a related plurality of relationship edges of each of the one or more entities at varying levels of confidence; and
    cataloging the related plurality of the nodes and the related plurality of relationship edges for each of the one or more entities at the varying levels of confidence in the information cataloging system by storing the relationship in the database, wherein the information cataloging system is configured to respond to a user query based on the cataloged related plurality of the nodes and the cataloged related plurality of relationship edges for each of the one or more entities at the varying levels of confidence.

2. The method of claim 1, further comprising assigning an identifier to each of the one or more entities, wherein an identifier is a randomly assigned value.

3. The method of claim 1, further comprising assigning an identifier to each of the one or more entities, wherein an identifier is derived from one or more nodes in the graph.

4. The method of claim 3, wherein the identifiers are represented as identifier nodes in the graph.

5. The method of claim 4, further comprising computing higher level edges between identifier nodes and one or more other nodes.

6. The method of claim 5, further comprising computing higher order edges between one or more pairs of nodes based on the existing one or more edges between the pairs of nodes.

7. The method of claim 6, further comprising computing a confidence level of the computed higher order edges based on distance of the computed higher order edges.

8. The method of claim 4, further comprising receiving a query to the graph to receive various relations for one or more of the entities.

9. The method of claim 8, wherein the query specifies a confidence level for inferring relations for one or more of the entities.

10. The method of claim 9, wherein the query results include associated confidence levels for the relations for the one of the entities.

11. The method of claim 10, further comprising retrieving identifiers assigned to one or more of the query results.

12. The method of claim 8, wherein the query is stored as new observation.

13. The method of claim 8, wherein the query specifying multiple fields and confidence level associated with each of the multiple fields.

14. The method of claim 8, wherein the query is added as a new observation in real-time or in a batch mode.

15. The method of claim 1, wherein each of the entities represent at least one of an individual, a household, a company, a shared interest, and an organization.

16. A physical article of manufacture including one or more tangible computer-readable storage media, encoding computer-executable instructions for executing a computer process on a computer system comprising one or more hardware processors, the computer process comprising:
    detecting a plurality of observations including various elements related to different entities;
    representing the one or more of various elements as nodes in a graph in an information cataloging system executed by one or more hardware processors by storing the observations in a database;
    representing relations between one or more nodes as relation edges in the graph;
    assigning confidence levels to one or more of the plurality of nodes;
    assigning, using the information cataloging system, a score to each relationship edge based on metadata related to the relations represented by the relationship edge;
    computing confidence values for one or more of the relationship edges based on confidence levels assigned to the nodes associated with the edges and the score assigned to each of the relationship edges;
    traversing the graph to identify a related plurality of the nodes and a related plurality of relationship edges of each of the one or more entities at varying levels of confidence; and
    cataloging the related plurality of the nodes and the related plurality of relationship edges for each of the one or more entities at the varying levels of confidence in the information cataloging system by storing the relationship in the database, wherein the information cataloging system is configured to respond to a user query based on the cataloged related plurality of the nodes and the cataloged related plurality of relationship edges for each of the one or more entities at the varying levels of confidence.

17. The physical article of manufacture of claim 16, wherein the computer process further comprising assigning an identifier to each of the one or more entities, wherein an identifier is a randomly assigned value.

18. The physical article of manufacture of claim 16, wherein the computer process further comprising assigning an identifier to each of the one or more entities, wherein an identifier is derived from one or more nodes in the graph.

19. The physical article of manufacture of claim 16, wherein the identifiers are represented as identifier nodes in the graph.

20. The physical article of manufacture of claim 16, wherein the computer process further comprising computing higher level edges between identifier nodes and one or more other nodes.

\* \* \* \* \*